US012674576B2

(12) United States Patent
Liszkai et al.

(10) Patent No.: US 12,674,576 B2
(45) Date of Patent: Jul. 7, 2026

(54) STRESS RELIEVING ATTACHMENT OF TUBE TO TUBESHEET, SUCH AS IN A PRESSURE VESSEL SHELL OF A NUCLEAR REACTOR POWER SYSTEM

(71) Applicant: NuScale Power, LLC, Portland, OR (US)

(72) Inventors: Tamas R. Liszkai, Corvallis, OR (US); Todd Sorensen, St Joseph, MI (US)

(73) Assignee: NuScale Power, LLC, Corvallis, OR (US)

( * ) Notice: Subject to any disclaimer, the term of this patent is extended or adjusted under 35 U.S.C. 154(b) by 661 days.

(21) Appl. No.: 17/991,837

(22) Filed: Nov. 21, 2022

(65) Prior Publication Data

US 2023/0162879 A1 May 25, 2023

Related U.S. Application Data

(60) Provisional application No. 63/282,053, filed on Nov. 22, 2021.

(51) Int. Cl.
*F22B 37/00* (2006.01)
*G21C 1/32* (2006.01)

(52) U.S. Cl.
CPC ............ *F22B 37/002* (2013.01); *G21C 1/322* (2013.01)

(58) Field of Classification Search
CPC ........ F22B 31/003; F22B 37/208; F22B 1/00; F22B 29/06; F22B 37/228; F22B 37/104; F22B 37/002; F28F 9/0131; F28F 9/013
See application file for complete search history.

(56) References Cited

U.S. PATENT DOCUMENTS 2,185,929 A 1/1940 Simpson et al.
2,537,678 A 1/1951 Fritz
(Continued)

FOREIGN PATENT DOCUMENTS

BE 873735 A 7/1979
CA 2796439 A1 10/2011
(Continued)

OTHER PUBLICATIONS

Office Action for Canadian Application No. 3,235,591, Dated Apr. 22, 2025, 4 pages.
(Continued)

*Primary Examiner* — Gregory A Wilson
(74) *Attorney, Agent, or Firm* — Lee & Hayes, P.C.

(57) ABSTRACT

Steam generator systems including tubesheet assemblies, such as for use in nuclear reactor systems, and associated devices and methods are described herein. A representative steam generator system can be installed in a nuclear reactor vessel positioned to house a primary coolant. The steam generator system can include a tubesheet assembly defining a plenum and comprising a tubesheet and a flexible connection portion coupling the tubesheet to the reactor vessel. The tubesheet can include a plurality of perforations fluidly coupled to the plenum. The steam generator system can further comprise a plurality of heat transfer tubes fluidly coupled to the perforations and configured to receive a flow of a secondary coolant. The connection portion can be more flexible than the tubesheet and the reactor vessel to reduce stresses on the tubesheet and the connections (e.g., tube-to-tubesheet (TTS) welds) between the tubes and the tubesheet during operation of the nuclear reactor system.

13 Claims, 13 Drawing Sheets

(56) References Cited

U.S. PATENT DOCUMENTS

| | | | | |
|---|---|---|---|---|
| 3,213,833 | A | 10/1965 | Cunningham | |
| 3,255,088 | A * | 6/1966 | Ammon | F22B 1/08 376/400 |
| 3,394,051 | A | 7/1968 | Purdy | |
| 3,859,964 | A | 1/1975 | Kozeki | |
| 3,941,187 | A | 3/1976 | Jabsen et al. | |
| 4,072,563 | A | 2/1978 | McDonald et al. | |
| 4,098,329 | A | 7/1978 | Culver | |
| 4,124,064 | A * | 11/1978 | Jabsen | F22B 1/162 165/145 |
| 4,357,991 | A | 11/1982 | Cameron | |
| 5,011,652 | A | 4/1991 | Tominaga et al. | |
| 5,045,274 | A | 9/1991 | Donaldson | |
| 5,098,329 | A | 3/1992 | Tseng | |
| 5,102,616 | A | 4/1992 | Gardner | |
| 5,331,677 | A * | 7/1994 | Matsuoka | G21C 15/18 376/405 |
| 5,349,617 | A | 9/1994 | Gautier | |
| 6,357,114 | B1 | 3/2002 | Tang et al. | |
| 6,536,252 | B1 | 3/2003 | Waring | |
| 6,708,651 | B1 | 3/2004 | Sun | |
| 8,681,928 | B2 | 3/2014 | Steinmoeller et al. | |
| 8,687,759 | B2 | 4/2014 | Reyes, Jr. et al. | |
| 8,744,035 | B1 | 6/2014 | Young et al. | |
| 8,752,510 | B2 | 6/2014 | Williams et al. | |
| 9,230,697 | B2 | 1/2016 | Groome et al. | |
| 9,275,761 | B2 | 3/2016 | Cronje et al. | |
| 9,406,409 | B2 | 8/2016 | Reyes, Jr. et al. | |
| 9,897,308 | B2 | 2/2018 | Lobscheid | |
| 9,997,262 | B2 * | 6/2018 | Liszkai | G21C 15/12 |
| 10,147,507 | B2 | 12/2018 | Groome et al. | |
| 10,685,752 | B2 * | 6/2020 | Liszkai | G21C 1/322 |
| 11,062,811 | B2 | 7/2021 | Liszkai et al. | |
| 12,040,097 | B2 * | 7/2024 | Liszkai | G21C 15/16 |
| 2004/0114705 | A1 | 6/2004 | Kitch et al. | |
| 2005/0069079 | A1 | 3/2005 | Boardman et al. | |
| 2009/0129530 | A1 | 5/2009 | Reyes, Jr. et al. | |
| 2009/0129531 | A1 | 5/2009 | Reyes, Jr. et al. | |
| 2009/0161812 | A1 | 6/2009 | Reyes, Jr. et al. | |
| 2009/0260584 | A1 | 10/2009 | Watakabe et al. | |
| 2010/0316181 | A1 | 12/2010 | Thome et al. | |
| 2011/0120688 | A1 | 5/2011 | Kadah | |
| 2011/0247793 | A1 | 10/2011 | Schoubye et al. | |
| 2012/0076254 | A1 | 3/2012 | Malloy | |
| 2012/0111287 | A1 | 5/2012 | Williams et al. | |
| 2012/0160465 | A1 | 6/2012 | Webb | |
| 2012/0263270 | A1 | 10/2012 | Malloy et al. | |
| 2012/0275558 | A1 | 11/2012 | Cinotti | |
| 2012/0294410 | A1 | 11/2012 | Steinmoeller et al. | |
| 2013/0044853 | A1 * | 2/2013 | Kim | G21C 15/02 122/235.15 |
| 2013/0121453 | A1 | 5/2013 | Shargots | |
| 2013/0182813 | A1 | 7/2013 | Bingham | |
| 2013/0279643 | A1 | 10/2013 | Groome et al. | |
| 2013/0308740 | A1 | 11/2013 | Fatih et al. | |
| 2015/0129193 | A1 | 5/2015 | Gallarda et al. | |
| 2016/0232996 | A1 | 8/2016 | Liszkai | |
| 2018/0005712 | A1 | 1/2018 | Liszkai et al. | |

FOREIGN PATENT DOCUMENTS

| | | | |
|---|---|---|---|
| CA | 2796487 | A1 | 10/2011 |
| CH | 527390 | A | 8/1972 |
| CN | 1086038 | A | 4/1994 |
| CN | 101307897 | A | 11/2008 |
| CN | 102272856 | A | 12/2011 |
| CN | 103077751 | A | 5/2013 |
| CN | 210374728 | U | 4/2020 |
| DE | 2262150 | A1 | 7/1974 |
| DE | 3533219 | C1 | 11/1986 |
| EP | 0616679 | B1 | 3/1997 |
| FR | 1526787 | A | 5/1968 |
| JP | S3820800 | B | 1/1963 |
| JP | 5127801 | | 8/1976 |
| JP | S54119157 | A | 9/1979 |
| JP | S58187894 | A | 11/1983 |
| JP | S59995 | U | 6/1984 |
| JP | S59131845 | A | 7/1984 |
| JP | S59195190 | A | 11/1984 |
| JP | S6148201 | U | 4/1986 |
| JP | 238893 | A | 2/1990 |
| JP | H03502005 | A | 5/1991 |
| JP | H08166102 | A | 6/1996 |
| JP | 10332882 | A2 | 12/1998 |
| JP | 2001188093 | A | 7/2001 |
| JP | 2005189013 | A | 7/2005 |
| JP | 2006162339 | A | 6/2006 |
| JP | 2012117821 | A | 6/2012 |
| JP | 5525722 | B2 | 4/2014 |
| JP | 2017500581 | A | 1/2017 |
| WO | 2011003140 | A1 | 1/2011 |
| WO | 2011097597 | A1 | 8/2011 |
| WO | 2011130841 | A1 | 10/2011 |
| WO | 2012022531 | A2 | 2/2012 |
| WO | 2012047438 | A1 | 4/2012 |
| WO | 2013158950 | A3 | 10/2013 |
| WO | 2013182392 | A1 | 12/2013 |
| WO | 2013185229 | A1 | 12/2013 |
| WO | WO2020009734 | A1 | 1/2020 |

OTHER PUBLICATIONS

Office Action for Japanese Application No. 2024-529440, Dated Mar. 18, 2025, 8 pages.

El-Nagdy, M. et al. "Design and Performance of the Helically Coiled Boilers of Two AGR Power Stations in the United Kingdom" 1988; London; pp. 39-48.

ISA, International Preliminary Report on Patentability for PCT Application No. PCT/US2013/037292. Mail Date: Oct. 30, 2014. 6 pages.

ISA, International Search Report and Written Opinion for PCT Application No. PCT/US2013/037292. Mail Date: Oct. 21, 2013. 9 pages.

ISA, International Search Report and Written Opinon for PCT Application No. PCT/US2014/061145. Mail Date: Jul. 6, 2015, 15 pages.

ISA, International Search Report and Written Opinion for PCT Application No. PCT/US2015/060173. Mail Date: Mar. 21, 2016. 12 pages.

International Search Report and Written Opinion in International Patent Application No. PCT/US22/50649, Feb. 28, 2023, 13 pages.

Kang, H-O. et al. "Structural Integrity Confirmation of a NCE-Through Steam Generator from the Viewpoint of Flow Instability" Journal of Nuclear Science and Technology, 2007; vol. 44, No. 1, pp. 64-72.

Khabensky, V. et al. "Coolant Flow Instabilities in Power Equipment" CRC Press, Chapter 3; Simplified Correlations for Determining the Two-Phase Flow Thermal-Hydraulic Oscillatory Stability Boundary pp. 73-79.

Klake, R.D. et al. "Investigation on the Nuclear Steam Generator of NS Otto Hahn" 1979. 33 pages.

Kobayashi. "Study on the Flow Instability in a Once-Through Steam Generator for Integrated Type Marine Water Reactor" National Maritime Research Institute; Mar. 1984.

Papini, D. et al. "Experimental Characterization of Two-Phase Flow Instability Thresholds in Helically Coiled Parallel Channels." Nice, France; May 2-5, 2011.

Weber, M.H. "THTR-Steam Generator Flow Stability" 1988; Switzerland; pp. 200-203.

Search Report for European Application No. 22896590.1, Dated Oct. 13, 2025, 9 pages.

* cited by examiner

STRESS RELIEVING ATTACHMENT OF TUBE TO TUBESHEET, SUCH AS IN A PRESSURE VESSEL SHELL OF A NUCLEAR REACTOR POWER SYSTEM

CROSS-REFERENCE TO RELATED APPLICATION

This application claims the benefit of U.S. Provisional Patent Application No. 63/282,053, filed Nov. 22, 2021, and titled "STRESS RELIEVING ATTACHMENT OF TUBE TO TUBESHEET IN A PRESSURE VESSEL SHELL OF A NUCLEAR POWER SYSTEM," which is incorporated herein by reference in its entirety.

FEDERALLY SPONSORED RESEARCH OR DEVELOPMENT

This invention was made with government support under Contract #DE-NE-000-8928 awarded by the Department of Energy. The government has certain rights in the invention.

TECHNICAL FIELD

The present technology is related to steam generator systems including tubesheet assemblies for use in, for example, nuclear reactor power systems. More particularly, the present technology is related to stress-relieving attachments for attaching a tubesheet to a reactor vessel.

BACKGROUND

Nuclear reactor systems often include one or more steam generators positioned within a nuclear reactor vessel. The reactor vessel houses a reactor core and a primary coolant that absorbs heat produced from a nuclear reaction (e.g., a fission reaction) within the reactor core. Such a steam generator can include multiple tubes (e.g., helical tubes) within the reactor vessel that extend between a feedwater header and a steam header. Secondary coolant (e.g., water) enters the tubes at the feedwater header, rises through the tubes and converts to vapor (e.g., steam) as the secondary coolant absorbs heat from the primary coolant, and exits the tubes at the steam header for use in a power conversion system. The tubes can be connected to a tubesheet, such as a perforated plate, at and/or proximate to the feedwater header and/or the steam header (e.g., via tube-to-tubesheet (TTS) welds). The tubesheets can be integral with or attached to the reactor vessel.

Large stresses can develop locally in the tubesheets and/or in the tube-to-tubesheet (TTS) welds due to incompatible motion under pressure and thermal loading of the tubesheets and the reactor vessel caused by the differing geometries thereof. As the nuclear reactor system undergoes transients, including startups and shutdowns, the stresses in the tubesheets can be cyclic, which can lead to fatigue and premature decommissioning of the steam generator.

BRIEF DESCRIPTION OF THE DRAWINGS

Many aspects of the present technology can be better understood with reference to the following drawings. The components in the drawings are not necessarily to scale. Instead, emphasis is placed on clearly illustrating the principles of the present technology.

DETAILED DESCRIPTION

Figure 1:
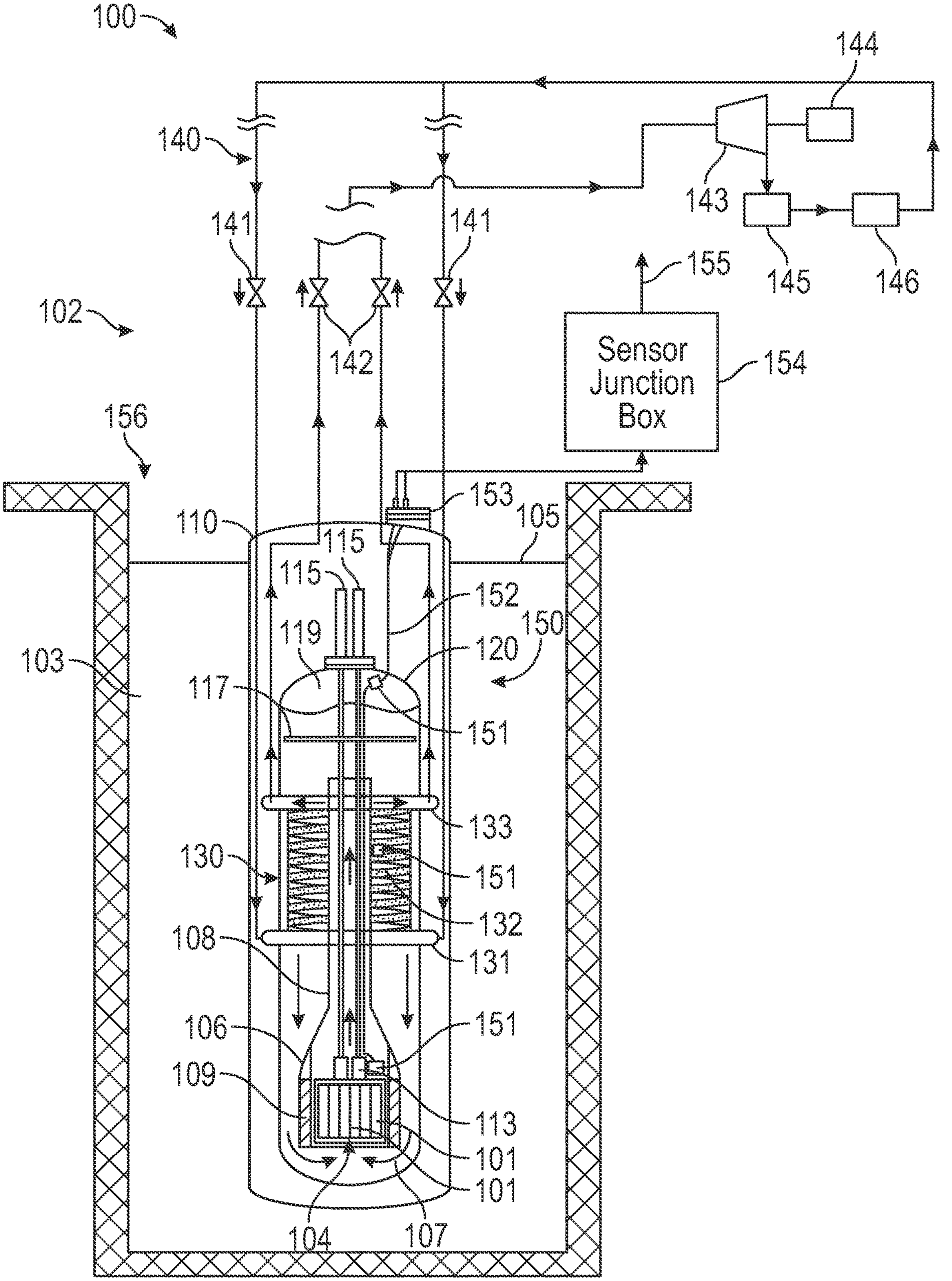
FIG. 1 is a partially schematic, partially cross-sectional view of a nuclear reactor system configured in accordance with embodiments of the present technology.

Aspects of the present disclosure are directed generally toward steam generator systems including tubesheet assemblies, such as for use in nuclear reactor power systems, and associated devices and methods. More particularly, some aspects of the present disclosure are directed toward stress-relieving attachments for attaching a tubesheet to a reactor vessel within a nuclear reactor power system. In several of the embodiments described below, for example, a representative steam generator system can be installed in a nuclear reactor vessel (e.g., a reactor pressure vessel shell) positioned to house a primary coolant. The steam generator system can include a tubesheet assembly defining a plenum and comprising a tubesheet and a flexible connection portion coupling the tubesheet to the reactor vessel. The tubesheet can include a plurality of perforations fluidly coupled to the plenum. The steam generator system can further comprise a plurality of heat transfer tubes fluidly coupled to the perforations and configured to receive a flow of a secondary coolant. The connection portion can be more flexible than the tubesheet and the reactor vessel to reduce stresses on the tubesheet and the connections (e.g., tube-to-tubesheet (TTS) welds) between the heat transfer tubes and the tubesheet during operation of the nuclear reactor system. For example, the connection portion can be thinner than both the tubesheet and the adjoining reactor vessel.

Accordingly, in some aspects of the present technology, the connection portion can mitigate or reduce stresses (e.g., discontinuity stresses and/or fatigue) in the tubesheet and/or in the associated connections (e.g., tube-to-tubesheet (TTS) welds) between the tubesheet and the corresponding heat transfer tubes by functioning as a flexible connection between the reactor vessel and the tubesheet. Such a flexible connection can decouple the incompatible deformation between the differing geometries of the tubesheet (e.g., a perforated flat plate) and the reactor vessel (e.g., a cylindrical vessel) during cyclic loads. In some embodiments, the cyclic fatigue life of the tubesheet and associated TTS welds can be increased by one order of magnitude, two orders of magnitude, or more—increasing the lifespan of the steam generator system.

Certain details are set forth in the following description and in FIGS. 1-7C to provide a thorough understanding of various embodiments of the present technology. In other instances, well-known structures, materials, operations, and/or systems often associated with tubesheet assemblies, tubesheets, nuclear reactor power conversion systems, heat transfer tubes, steam generators, and the like, are not shown or described in detail in the following disclosure to avoid unnecessarily obscuring the description of the various embodiments of the technology. Those of ordinary skill in the art will recognize, however, that the present technology can be practiced without one or more of the details set forth herein, and/or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to limit its scope unless expressly indicated. The sizes of various depicted elements are not necessarily drawn to scale, and these various elements may be enlarged to improve legibility. Component details may be abstracted in the Figures to exclude details such as position of components and certain precise connections between such components when such details are unnecessary for a complete understanding of how to make and use the present technology. Many of the details, dimensions, angles and other features shown in the Figures are merely illustrative of particular embodiments of the disclosure. Accordingly, other embodiments can have other details, dimensions, angles and features without departing from the present technology. In addition, those of ordinary skill in the art will appreciate that further embodiments of the present technology can be practiced without several of the details described below.

To the extent any materials incorporated herein by reference conflict with the present disclosure, the present disclosure controls. The headings provided herein are for convenience only and should not be construed as limiting the subject matter disclosed.

I. Select Embodiments of Nuclear Reactor Power Conversion Systems

FIG. 1 is a partially schematic, partially cross-sectional view of a nuclear reactor system 100 configured in accordance with embodiments of the present technology. The system 100 can include a power module 102 having a reactor core 104 in which a controlled nuclear reaction takes place. Accordingly, the reactor core 104 can include one or more fuel assemblies 101. The fuel assemblies 101 can include fissile and/or other suitable materials. Heat from the reaction generates steam at one or more steam generator systems 130, which direct the steam to a power conversion system 140. The power conversion system 140 generates electrical power, and/or provides other useful outputs. A sensor system 150 is used to monitor the operation of the power module 102 and/or other system components. The data obtained from the sensor system 150 can be used in real time to control the power module 102, and/or can be used to update the design of the power module 102 and/or other system components.

The power module 102 includes a containment vessel 110 (e.g., a radiation shield vessel, a radiation shield container, and/or the like) that houses/encloses a reactor vessel 120 (e.g., a reactor pressure vessel, a reactor pressure shell, a reactor pressure container and/or the like), which in turn houses the reactor core 104. The containment vessel 110 can be housed in a power module bay 156. The power module bay 156 can contain a cooling pool 103 filled with water and/or another suitable cooling liquid. The bulk of the power module 102 can be positioned below a surface 105 of the cooling pool 103. Accordingly, the cooling pool 103 can operate as a thermal sink, for example, in the event of a system malfunction.

A volume between the reactor vessel 120 and the containment vessel 110 can be partially or completely evacuated to reduce heat transfer from the reactor vessel 120 to the surrounding environment (e.g., to the cooling pool 103). However, in other embodiments the volume between the reactor vessel 120 and the containment vessel 110 can be at least partially filled with a gas and/or a liquid that increases heat transfer between the reactor vessel 120 and the containment vessel 110.

Within the reactor vessel 120, a primary coolant 107 conveys heat from the reactor core 104 to the steam generator system 130. For example, as illustrated by arrows located within the reactor vessel 120, the primary coolant 107 is heated at the reactor core 104 toward the bottom of the reactor vessel 120. The heated primary coolant 107 (e.g., water with or without additives) rises from the reactor core 104 through a core shroud 106 and to a riser tube 108. The hot, buoyant primary coolant 107 continues to rise through the riser tube 108, then exits the riser tube 108 and passes downwardly through the steam generator system 130. The steam generator system 130 includes a multitude of conduits 132 (e.g., tubes, heat transfer tubes) that are arranged circumferentially around the riser tube 108, for example, in a helical pattern, as is shown schematically in FIG. 1. The descending primary coolant 107 transfers heat to a secondary coolant (e.g., water) within the conduits 132, and descends to the bottom of the reactor vessel 120 where the cycle begins again. The cycle can be driven by the changes in the buoyancy of the primary coolant 107, thus reducing or eliminating the need for pumps to move the primary coolant 107.

The steam generator system 130 can include a lower header assembly 131 (e.g., a lower plena assembly, a lower tubesheet assembly, a feedwater header assembly, a first header assembly, a first tubesheet assembly, and/or the like) at which the incoming secondary coolant enters the steam generator conduits 132. The secondary coolant rises through the conduits 132, converts to vapor (e.g., steam), and is collected at an upper header assembly 133 (e.g., an upper plena assembly, an upper tubesheet assembly, a steam header assembly, a second header assembly, a second tubesheet assembly and/or the like). The vapor exits the upper header assembly 133 and is directed to the power conversion system 140.

The power conversion system 140 can include one or more steam valves 142 that regulate the passage of high pressure, high temperature steam from the steam generator system 130 to a steam turbine 143. The steam turbine 143 converts the thermal energy of the steam to electricity via a generator 144. The low-pressure steam exiting the steam turbine 143 is condensed at a condenser 145, and then directed (e.g., via a pump 146) to one or more feedwater valves 141. The feedwater valves 141 control the rate at which the feedwater re-enters the steam generator system 130 via the lower header assembly 131.

The power module 102 includes multiple control systems and associated sensors. For example, the power module 102 can include a hollow cylindrical reflector 109 that directs neutrons back into the reactor core 104 to further the nuclear reaction taking place therein. Control rods 113 are used to modulate the nuclear reaction, and are driven via fuel rod drivers 115. The pressure within the reactor vessel 120 can be controlled via a pressurizer plate 117 (which can also serve to direct the primary coolant 107 downwardly through the steam generator system 130) by controlling the pressure in a pressurizing volume 119 positioned above the pressurizer plate 117. In some embodiments, the upper header assembly 133 can be at least partially integrated into the pressurizer plate 117.

The sensor system 150 can include one or more sensors 151 positioned at a variety of locations within the power module 102 and/or elsewhere, for example, to identify operating parameter values and/or changes in parameter values. The data collected by the sensor system 150 can then be used to control the operation of the system 100, and/or to generate design changes for the system 100. For sensors positioned within the containment vessel 110, a sensor link 152 directs data from the sensors to a flange 153 (at which the sensor link 152 exits the containment vessel 110) and directs data to a sensor junction box 154. From there, the sensor data can be routed to one or more controllers and/or other data systems via a data bus 155.

II. Select Embodiments of Steam Generator Systems and Tubesheet Assemblies

FIGS. 2A-5 illustrate various steam generator systems or portions thereof configured in accordance with embodiments of the present technology that can be used within the nuclear reactor system 100 and/or other nuclear reactor systems. For example, the various steam generator systems can be used in addition or alternatively to the steam generator system 130 described in detail above with reference to FIG. 1, and can function in a similar or identical manner. In some embodiments, the steam generator systems can include some features that are at least generally similar in structure and function, or identical in structure and function, to those of the steam generator systems disclosed in (i) U.S. Pat. No. 9,997,262, titled "INTEGRAL REACTOR PRESSURE VESSEL TUBE SHEET," and filed Apr. 24, 2014 and/or (ii) U.S. Pat. No. 10,685,752, titled "STEAM GENERATOR WITH INCLINED TUBE SHEET," and filed Feb. 10, 2015, each of is incorporated herein by reference in its entirety.

Figure 2A:
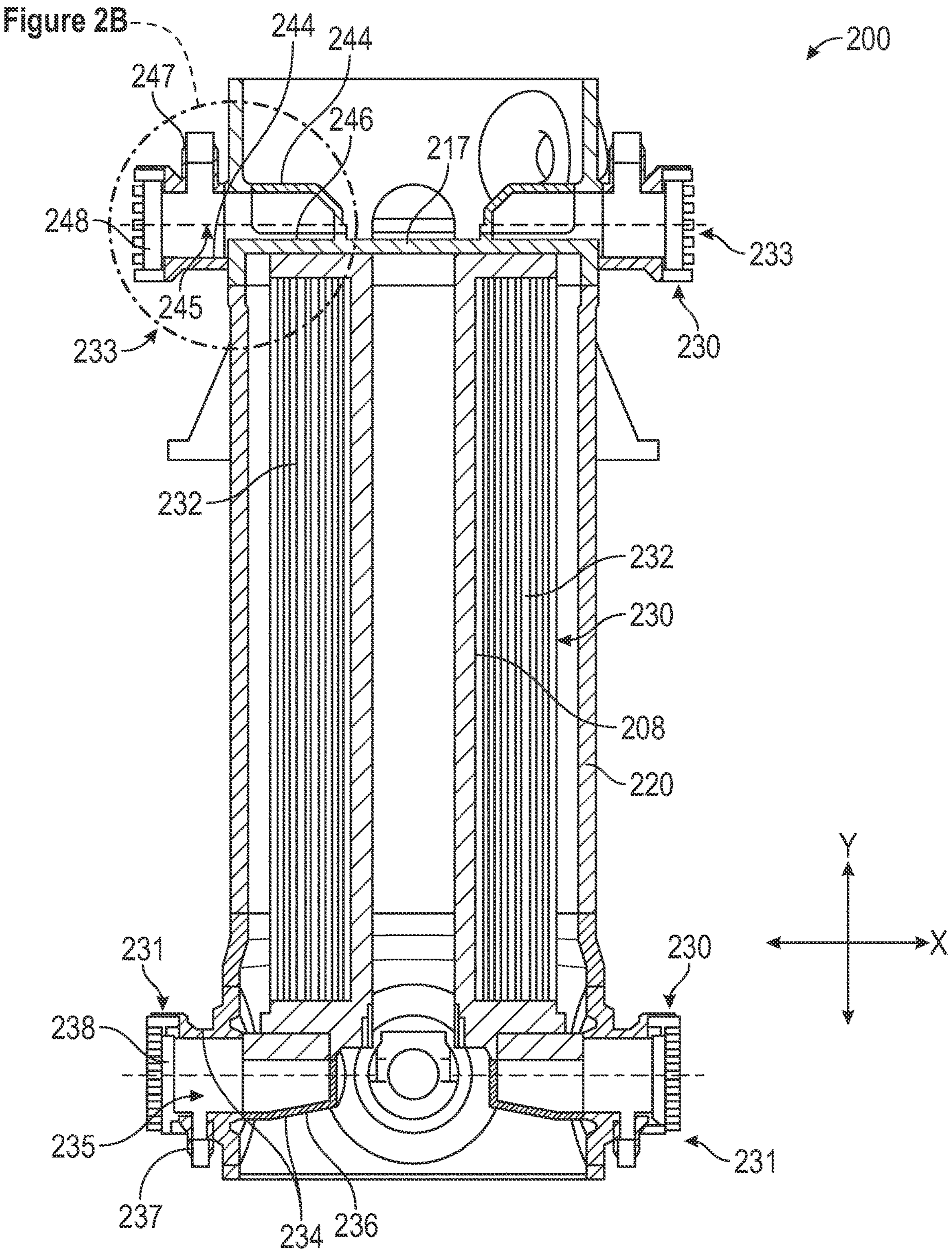
FIG. 2A is a cross-sectional side view of a nuclear reactor system including a steam generator system configured in accordance with embodiments of the present technology.

FIG. 2A is a cross-sectional side view of a nuclear reactor system 200 (e.g., a nuclear power system, a nuclear power conversion system, a nuclear reactor steam generation system, and/or the like) including a steam generator system 230 configured in accordance with embodiments of the present technology. The nuclear reactor system 200 can include a reactor vessel 220 configured to house (i) a reactor core (not shown in FIG. 2A) that generates heat, (ii) a primary coolant that absorbs the heat from the nuclear reactor, and (iii) a riser tube 208. The reactor vessel 220 can have a cylindrical shape. In the illustrated embodiment, the steam generator system 230 includes a plurality of heat transfer tubes 232 (e.g., conduits) positioned within the reactor vessel 220 and arranged circumferentially around the riser tube 208. The tubes 232 can extend helically about the riser tube 208. Individual ones of the tubes 232 have a lower portion fluidly coupled to a lower tubesheet assembly 231 (e.g., a lower header assembly) and an upper portion fluidly coupled to an upper tubesheet assembly 233 (e.g., an upper header assembly). The lower tubesheet assembly 231 and the upper tubesheet assembly 233 can be similar or identical in structure and/or function to the lower header assembly 131 and the upper header assembly, respectively, described in detail above with reference to FIG. 1.

In some embodiments, the steam generator system 230 includes multiple ones (e.g., four) of the lower tubesheet assemblies 231 and/or multiple ones (e.g., four) of the upper tubesheet assemblies 233 positioned circumferentially about the reactor vessel 220. Pairs of the lower and upper tubesheet assemblies 231, 233 can be fluidly coupled to a set of the tubes 232 to define an individual steam generator circuit. The lower and upper tubesheet assemblies 231, 233 can be coupled to or integral with the reactor vessel 220 and are positioned to provide a fluid flow path from the tubes 232 to/from the reactor vessel 220 to/from an external power conversion system (e.g., the power conversion system 140 of FIG. 1). In some embodiments, the lower and upper tubesheet assemblies 231, 233 are entirely contained within a containment vessel (e.g., the containment vessel 110 of FIG. 1) that surrounds the reactor vessel 220.

In operation, the primary coolant within the reactor vessel 220 is heated and rises through the riser tube 208 past the tubes 232 before descending past the tubes 232 outside the riser tube 208. The tubes 232 receive a secondary coolant (e.g., water) via the lower tubesheet assemblies 231. The secondary coolant rises through the tubes 232 and heat is thermally transferred to the secondary coolant from the primary coolant such that the secondary coolant become super-heated vapor (e.g., steam). The secondary coolant in the steam generator system 230 can be isolated from the primary coolant in reactor vessel 220 such that they are not allowed to mix or come into direct contact with one another. The vaporized secondary coolant exits the tubes 232 into the upper tubesheet assemblies 233 for transfer to a power conversion system. After the heat from the secondary coolant is utilized by the power conversion system, the secondary coolant can be returned to the steam generator system 230 via the lower tubesheet assemblies 231.

The lower tubesheet assemblies 231 can be identical and can each include a body 234 (e.g., a wall, a body portion, a wall portion, and/or the like) integrally formed with or attached to the reactor vessel 220 and defining a plenum 235. The body 234 can include a tubesheet 236 (e.g., a perforated plate) and/or the tubesheet 236 can be a separate component attached to the body 234. The lower portions of the tubes 232 can be coupled (e.g., welded, affixed) to the tubesheet 236 which is positioned to route the secondary coolant from the plenum 235 to the tubes 232. In the illustrated embodiment, the tubesheet 236 is positioned within the annular region between the reactor vessel 220 and the riser tube 208 and is oriented in a horizontal or radial position. That is, the tubesheet 236 can extend along an axis X that extends orthogonal to a longitudinal axis Y of the reactor vessel 220. The body 234 can further include/define an inlet port 237 (e.g., a feed nozzle) that can be connected to a feed pipe for receiving the secondary coolant and that is positioned to direct the secondary coolant from the feed pipe into the plenum 235. In some embodiments, the lower tubesheet assembly 231 further includes a removable cover plate 238 that can be coupled (e.g., bolted) to the body 234 to enclose the plenum 235. The removable cover plate 238 can be removed from and/or installed on the body 234 during one or more operations such as maintenance, inspection, and/or installation.

Figure 2B:
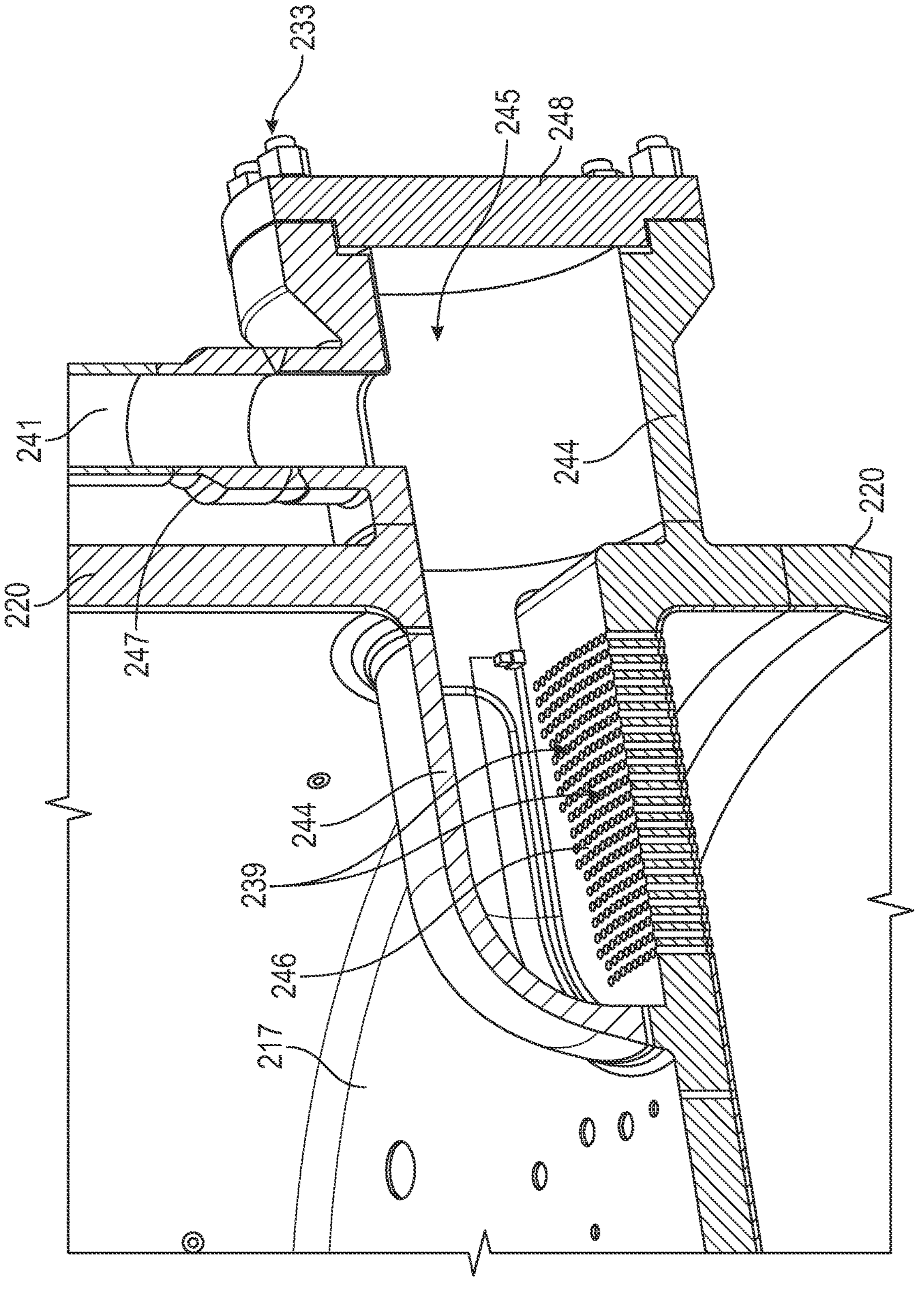
FIG. 2B is an enlarged side cross-sectional view of an upper tubesheet assembly of the steam generator system of FIG. 2A in accordance with embodiments of the present technology.

FIG. 2B is an enlarged side cross-sectional view of one of the upper tubesheet assemblies 233 configured in accordance with embodiments of the present technology. Referring to FIGS. 2A and 2B, the upper tubesheet assemblies 233 can be identical and can include some features generally similar or identical to those of the lower tubesheet assemblies 231. For example, the upper tubesheet assemblies 233 can each include a body 244 integrally formed with or attached to the reactor vessel 220 and defining or bounding a plenum 245. The body 244 can define or include a tubesheet 246 (e.g., a perforated plate) and/or the tubesheet 246 can be a separate component attached to the body 244. In some embodiments, the tubesheet 246 comprises a portion of a pressurizer plate 217 of the nuclear reactor system 200. The upper portions of the tubes 232 can be coupled (e.g., welded, affixed) to the tubesheet 246, which is positioned to route the secondary coolant from the tubes 232 to the plenum 245. In the illustrated embodiment, the tubesheet 246 is oriented in a horizontal or radial position. That is, the tubesheet 246 can extend along the X axis orthogonal to the longitudinal axis Y of the reactor vessel 220. The body 244 can further include/define an outlet port 247 (e.g., a steam nozzle) that can be connected to a steam pipe 241 (FIG. 2B) for receiving the secondary coolant and that is positioned to direct the secondary coolant from the plenum 245 to the steam pipe. In some embodiments, the upper tubesheet assembly 233 further includes a removable cover plate 248 that can be coupled (e.g., bolted) to the body 244 to enclose the plenum 245. The removable cover plate 248 can be removed from and/or installed on the body 244 during one or more operations such as maintenance, inspection, and/or installation. Referring to FIG. 2B, the tubesheet 236 can be a generally flat plate including a plurality of perforations 239 (e.g., through-holes) arranged in rows. The perforations 239 extend through the tubesheet 236 and can be oriented parallel to the axis Y (FIG. 2A). The perforations 239 can be coupled to corresponding ones of the tubes 232 (e.g., via welding).

Figure 3A:
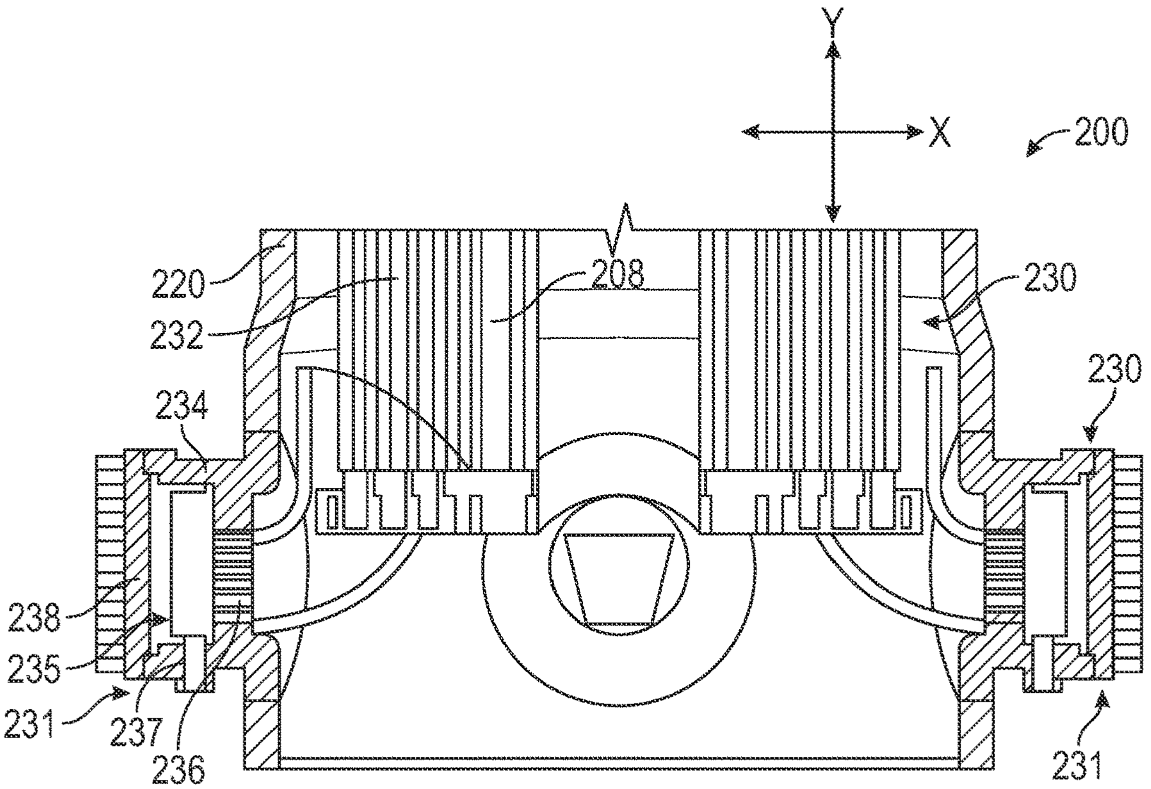
FIG. 3A is an enlarged cross-sectional side view of the nuclear reactor system and the steam generator system of FIG. 2A configured in accordance with additional embodiments of the present technology.

In some embodiments, the lower tubesheet assemblies 231 and/or the upper tubesheet assemblies 233 can have different configurations. For example, FIG. 3A is an enlarged cross-sectional side view of the nuclear reactor system 200 and the steam generator system 230 configured in accordance with additional embodiments of the present technology. In the illustrated embodiment, the body 234 is attached to or integrally formed with the reactor vessel 220 and is positioned generally radially outside the reactor vessel 220. The tubesheet 236 is positioned at and/or proximate to the wall of the reactor vessel 220 (e.g., substantially outside the annular region between the reactor vessel 220 and the riser tube 208) and is oriented in a vertical position. That is, the tubesheet 236 can extend generally parallel to the longitudinal axis Y of the reactor vessel 220.

Figure 3B:
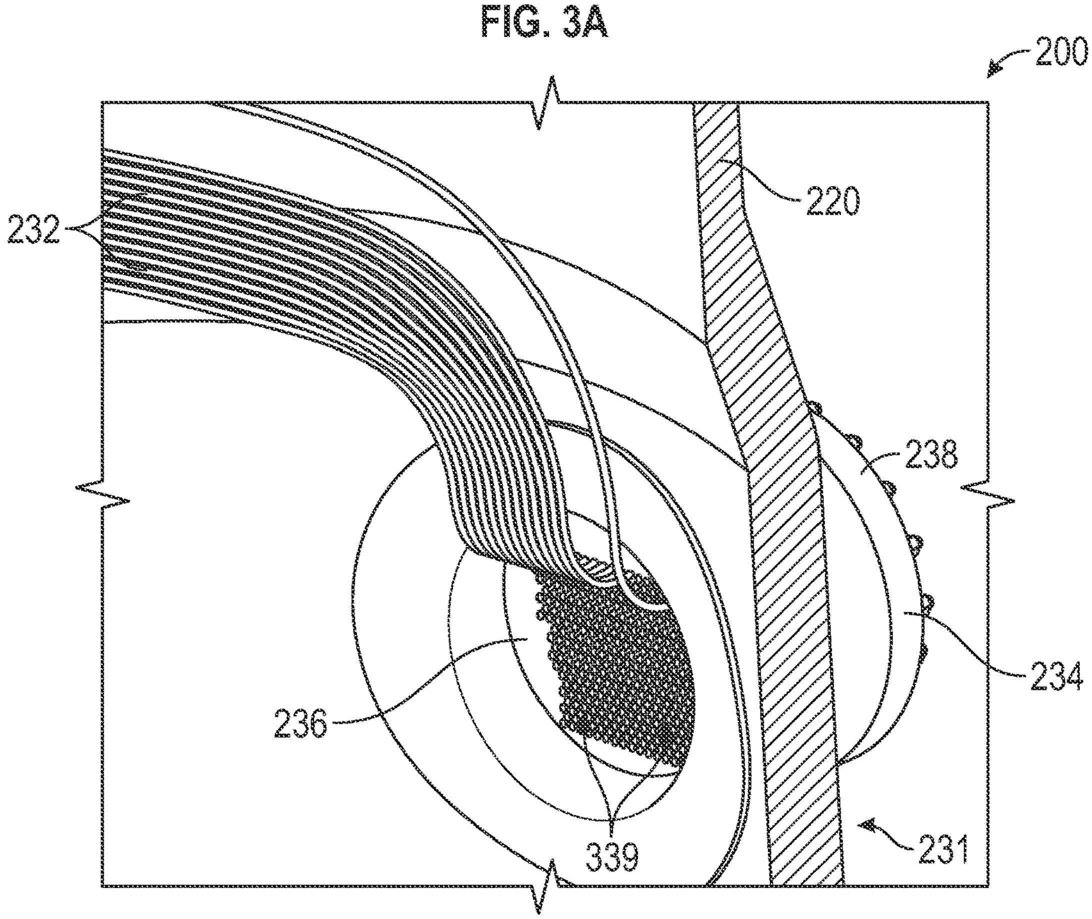
FIG. 3B is an enlarged isometric view of the steam generator system of FIG. 3A showing a lower tubesheet configured in accordance with embodiments of the present technology.

FIG. 3B is an enlarged isometric view of the nuclear reactor system 200 showing one of the lower tubesheet assemblies 231 of FIG. 3A in accordance with embodiments of the present technology. In the illustrated embodiment, the tubesheet 236 is a generally circular flat plate including a plurality of perforations 339 (e.g., through-holes) arranged in rows. The perforations 439 extend through the tubesheet 236 and can be oriented parallel to the axis X. The perforations 339 in individual ones of the rows can be coupled to corresponding ones of the tubes 232 in a vertical group of the tubes 232. Only some of the tubes 232 are shown in FIG. 3B for clarity.

Figure 4A:
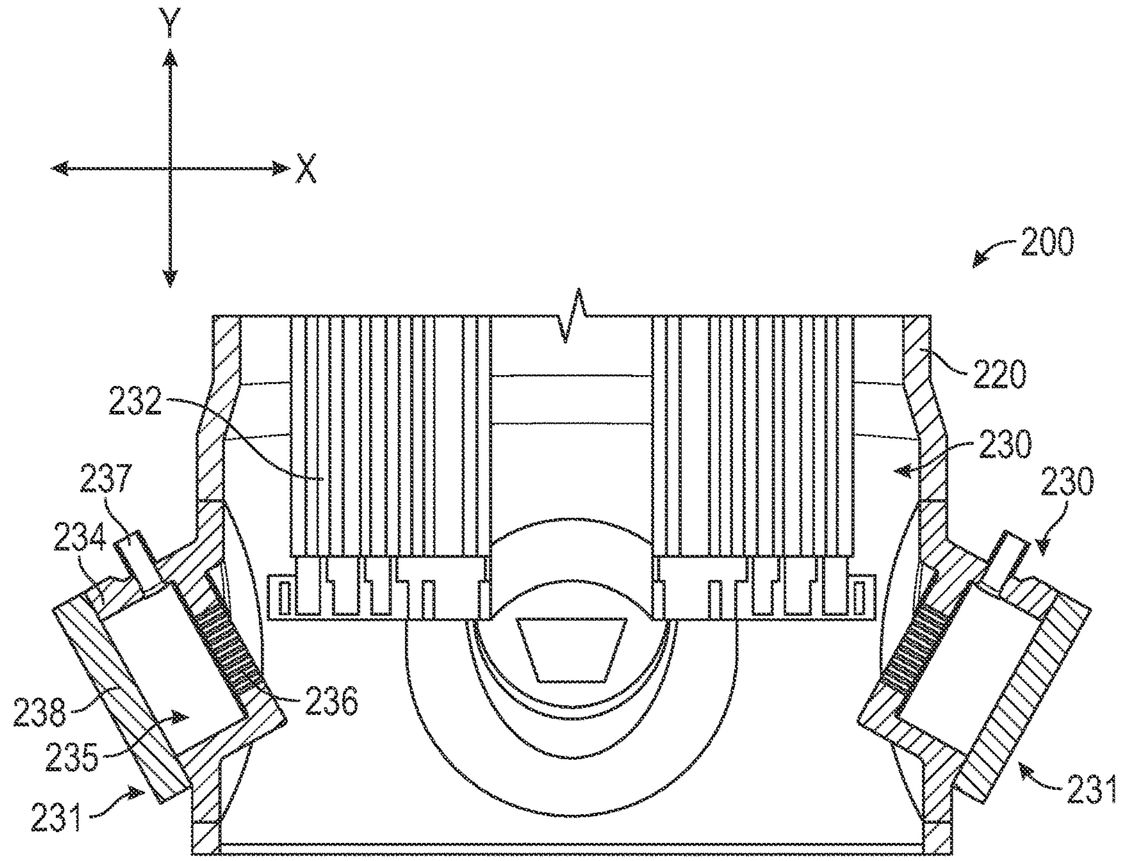
FIG. 4A is an enlarged cross-sectional side view of the nuclear reactor system and the steam generator system of FIG. 2A configured in accordance with additional embodiments of the present technology.
Figure 4B:
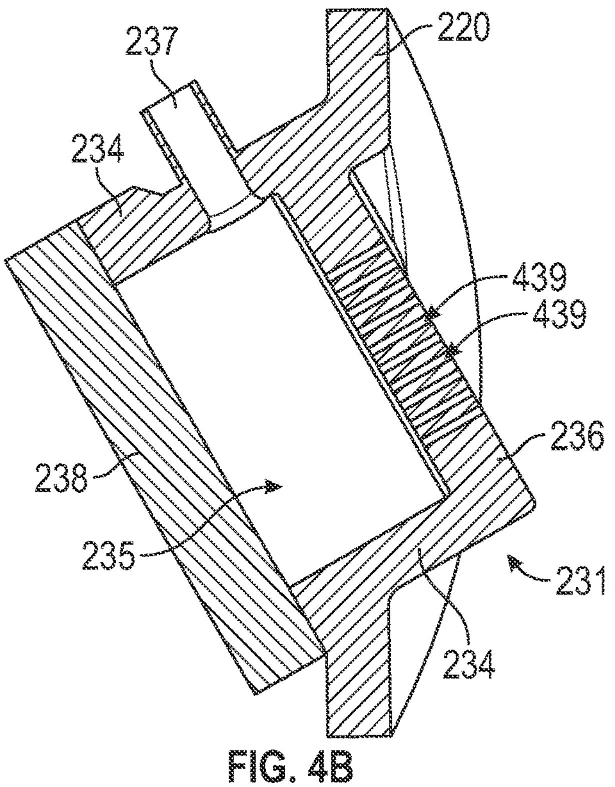
FIG. 4B is an enlarged cross-sectional side view of the steam generator system of FIG. 4A showing a lower tubesheet assembly in accordance with embodiments of the present technology.

FIG. 4A is an enlarged cross-sectional side view of the nuclear reactor system 200 and the steam generator system 230 configured in accordance with additional embodiments of the present technology. FIG. 4B is an enlarged cross-sectional side view of the nuclear reactor system 200 showing one of the lower tubesheet assemblies 231 of FIG. 4A in accordance with embodiments of the present technology. Referring to FIGS. 4A and 4B, in the illustrated embodiment the body 234 is attached to or integrally formed with the reactor vessel 220 and is positioned partially within and partially outside the reactor vessel 220. The tubesheet 236 similarly extends from within the reactor vessel 220 to outside the reactor vessel 220 and is angled (e.g., inclined) relative to the wall of the reactor vessel 220. That is, the tubesheet 236 can extend at a non-zero angle relative to the longitudinal axis Y of the reactor vessel 220 and the orthogonal axis X. In some embodiments, the tubesheet 236 can be angled less than about 60°, between about 10°-50°, between about 15°-45°, between about 20°-40°, between about 25°-35°, and/or about 30° relative to the longitudinal axis Y of the wall of the reactor vessel 220. As best seen in FIG. 3B, the tubesheet 236 can be a generally circular flat plate including a plurality of perforations 439 (e.g., through-holes). The perforations 439 extend through the tubesheet 236 and are angled (e.g., inclined) relative to the axes X, Y. The perforations 339 can be coupled to corresponding ones of the tubes 232.

Referring to FIGS. 2A-4B, the tubesheets 236 of the lower tubesheet assemblies 231 and the tubesheets 246 of the upper tubesheet assemblies 233 can be perforated flat plates that are integrally attached or directly affixed to the reactor vessel 220, which can have a cylindrical shape. Large stresses can develop locally in the tubesheets 236, 246 and/or in the connections (e.g., tube-to-tubesheet (TTS) welds) between the tubes 232 and the tubesheets 236, 246 due to incompatible motion under pressure and thermal loading of the steam generator system 230 and the reactor vessel 220 caused by the different geometries thereof. That is, the reactor vessel 220 can expand/contract at a different rate under thermal and pressure loads than the tubesheets 236, 246 because of the differing geometries of these components. This can lead to incompatible deformation at the interface between the tubesheets 236, 246 and the reactor vessel 220—which can cause discontinuity stresses and fatigue at the tubesheets 236, 246 and/or in the connections (e.g., tube-to-tubesheet (TTS) welds) between the tubes 232 and the tubesheets 236, 246 during cyclic loads. For example, as the nuclear reactor system 200 undergoes transients, including startups and shutdowns, the stresses in the tubesheets 236, 246 can be cyclic, which can lead to fatigue and premature decommissioning of the steam generator system 230.

In some aspects of the present technology, a tubesheet assembly (e.g., a header assembly) configured in accordance with the present technology can mitigate or reduce the stresses in a tubesheet and associated TTS welds by introducing a more flexible connection between the reactor vessel and the tubesheet. Such a flexible connection can decouple the incompatible deformation between the differing geometries of the tubesheet and the reactor vessel. For example, in some embodiments a tubesheet assembly can include a flexible section or portion between the reactor vessel and the tubesheet that is thinner than both the reactor vessel and the tubesheet. This can provide stress relief on the tubesheet by being more flexible than the parts it connects (e.g., the tubesheet and the reactor vessel).

Figure 5A:
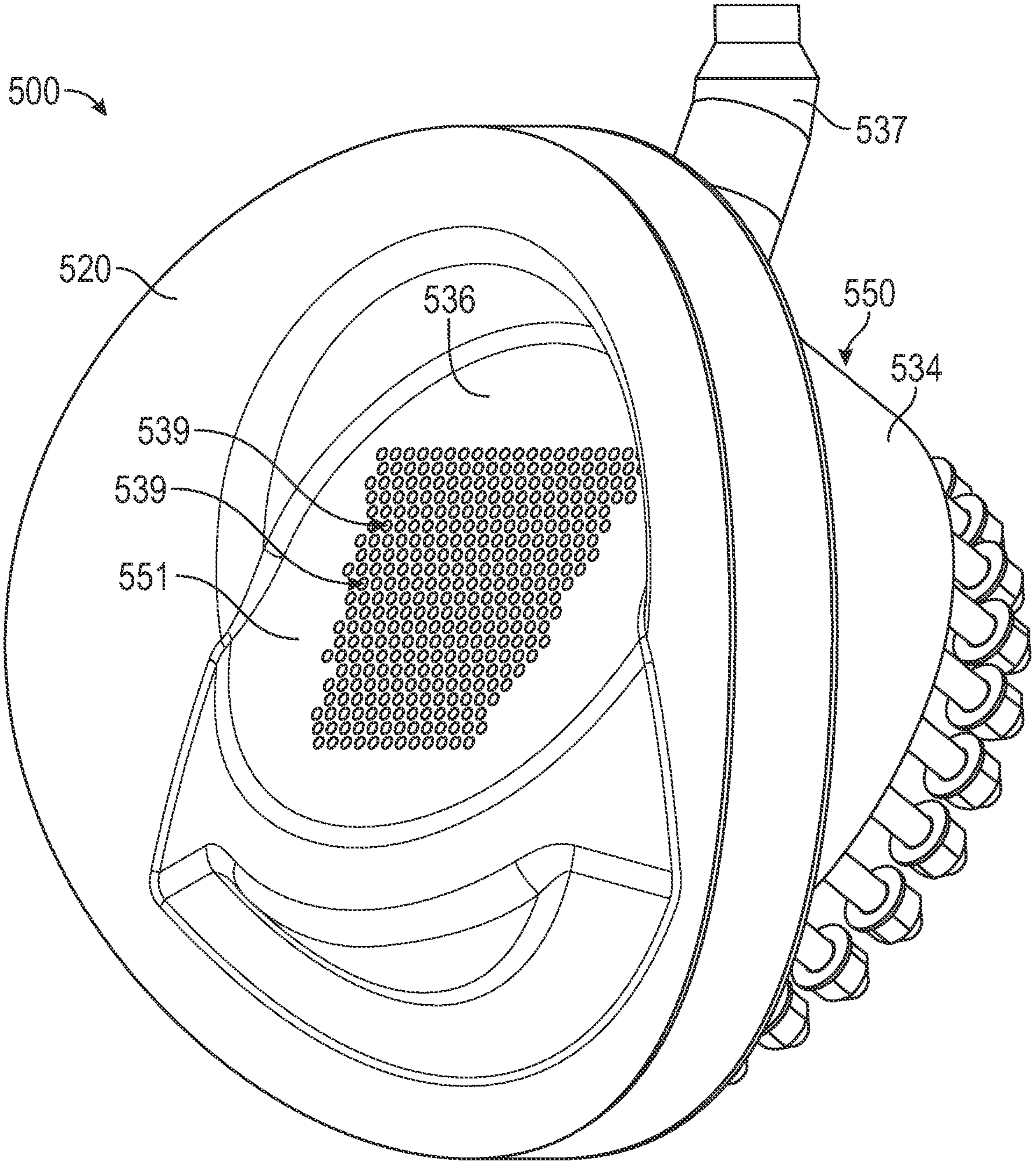
FIGS. 5A-5D are an isometric front view, a rear view, a cross-sectional side view, and a cross-sectional isometric view, respectively, of a portion of a nuclear reactor system configured in accordance with embodiments of the present technology.
Figure 5B:
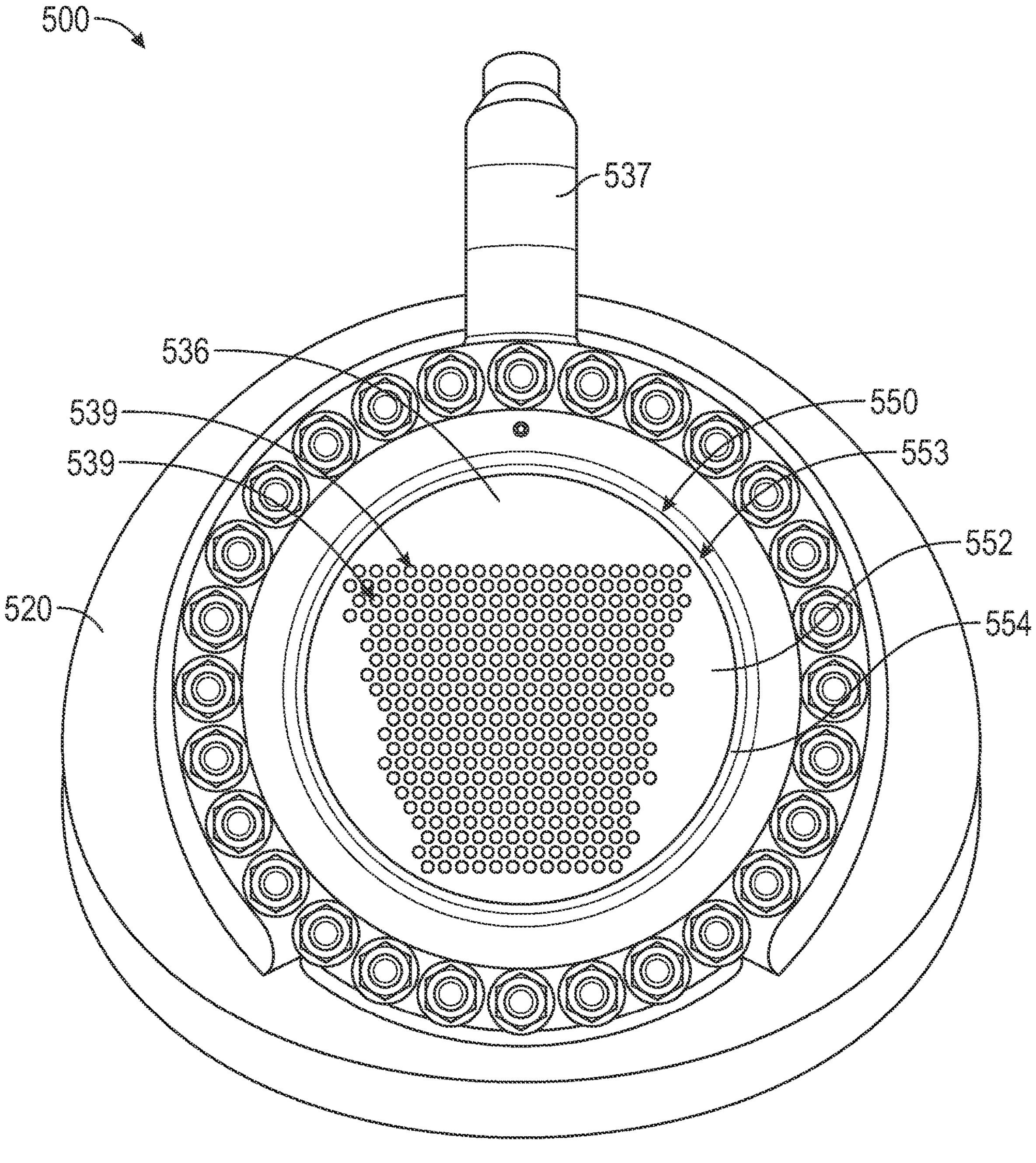

For example, FIGS. 5A-5D are an isometric front view, a rear view, a cross-sectional side view, and a cross-sectional isometric view, respectively, of a portion of a nuclear reactor system 500 in accordance with embodiments of the present technology. The nuclear reactor system 500 can include some features generally similar or identical to those of the nuclear reactor systems 100 and/or 200 described in detail above with reference to FIGS. 1-4B. For example, referring to FIGS. 5A-5D, the nuclear reactor system 500 includes a steam generator system having a tubesheet assembly 550 integrally formed with a reactor vessel 520. More specially, FIG. 5A is a front view of the tubesheet assembly 550 from within the reactor vessel 520 (e.g., generally facing in a direction toward an exterior of the reactor vessel 520) and FIG. 5B is a rear view of the tubesheet assembly 550 from outside the reactor vessel 520 (e.g., generally facing in a direction toward an interior of the reactor vessel 520). The reactor vessel 520 can have a cylindrical shape. In other embodiments, the tubesheet assembly 550 can be a separate component coupled to the reactor vessel (e.g., via welding, bolts, fasteners, etc.).

In the illustrated embodiment, the tubesheet assembly 550 includes a body 534 defining or bounding (at least in part) a plenum 535 (obscured in FIGS. 5A and 5B). The body 534 can further define a tubesheet 536 (e.g., a perforated plate) and/or the tubesheet 536 can be a separate component attached to the body 534 and the reactor vessel 520. In the illustrated embodiment, the tubesheet 536 is angled (e.g., inclined) by an angle A (FIG. 5C) relative to a longitudinal axis Y (FIG. 5C) of the reactor vessel 520 (and relative to an axis X shown in FIG. 5C that is orthogonal to the longitudinal axis Y). The angle A can be less than about 60°, between about 10°-50°, between about 15°-45°, between about 20°-40°, between about 25°-35°, and/or about 30°. As best seen in FIGS. 5A and 5B, the tubesheet 536 can be a generally circular flat plate including a plurality of perforations 539 (e.g., through-holes). The perforations 539 extend through the tubesheet 236 and are angled (e.g., inclined) relative to the axes X, Y. In some embodiments, the perforations 539 are arranged in a plurality of rows that can decrease in number in a downward direction along the longitudinal axis Y. The perforations 539 can be coupled to (e.g., welded to) corresponding ones of a plurality of heat transfer tubes (e.g., the heat transfer tubes 132 and/or 232 of FIG. 1A, 2A, and/or 3B) of the steam generator system.

The body 534 can further include/define a port 537 (e.g., a nozzle) fluidly coupled to the plenum 535. In some embodiments, the tubesheet assembly 550 is a lower tubesheet assembly (e.g., a feed assembly) configured to (i) receive a secondary coolant through the port 537 and (ii) direct the secondary coolant through the plenum 535 and out of the perforations 539 into the corresponding heat transfer tubes (e.g., from lower portions of the heat transfer tubes) coupled to the tubesheet 536. In other embodiments, the tubesheet assembly 550 is an upper tubesheet assembly (e.g., a vapor assembly) configured to (i) receive the secondary coolant in vapor form through the perforations 539 from the heat transfer tubes (e.g., from upper portions of the heat transfer tubes) coupled to the tubesheet 536 and (ii) direct the secondary coolant in vapor form through the plenum 535 to the port 537 for outlet to a power conversion system.

Figure 5C:
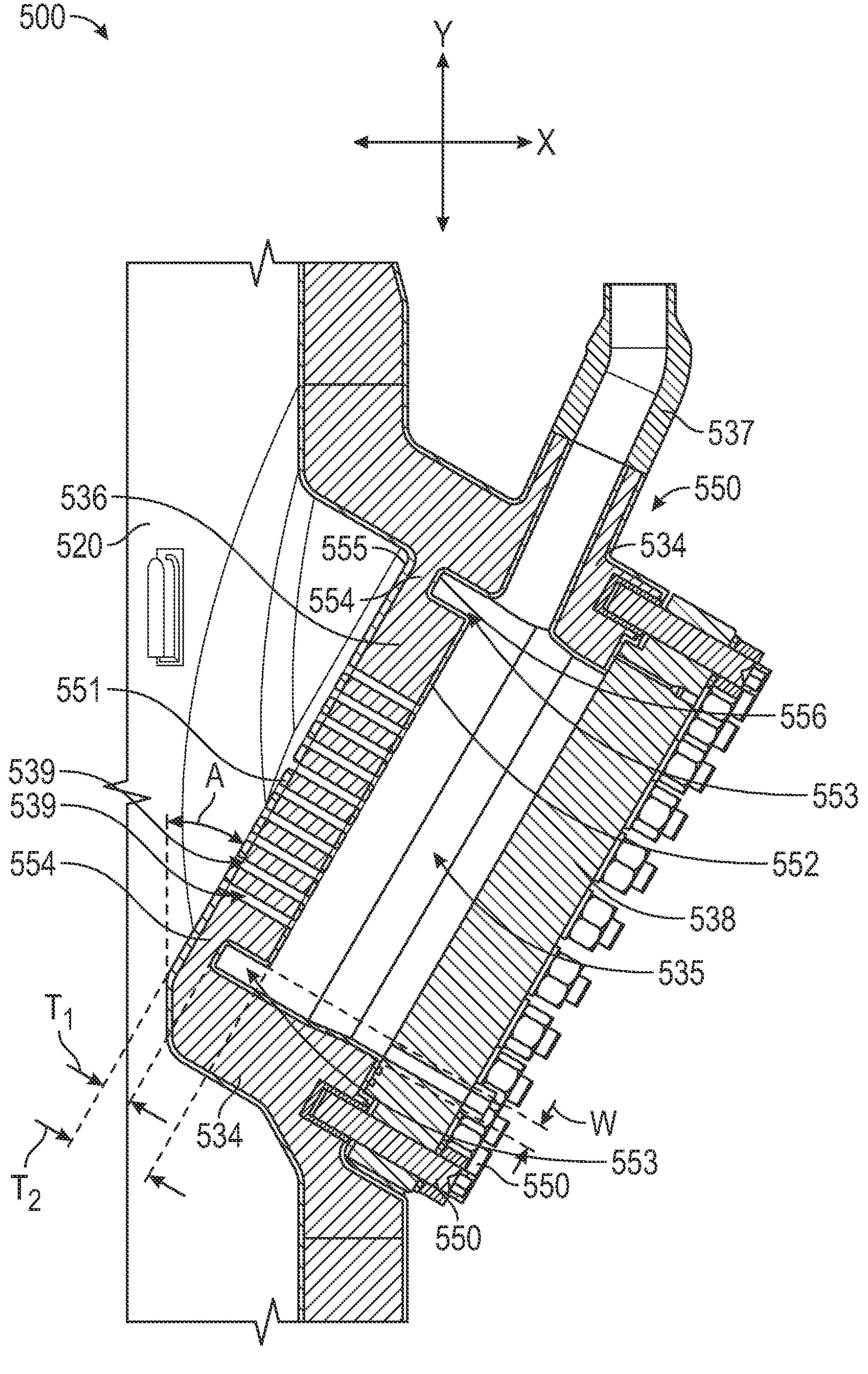

Referring to FIG. 5C, the tubesheet assembly 550 can further include a removable cover plate 538 that can be coupled to the body 534 via, for example, bolts 559. When attached to body 534, the cover plate 538 can enclose the plenum 535. The cover plate 538 can be removed from and/or installed on the body 534 during one or more operations such as maintenance, inspection, and/or installation. The cover plate 538 is shown as removed in FIGS. 5A, 5B, and 5D for clarity.

Figure 5D:
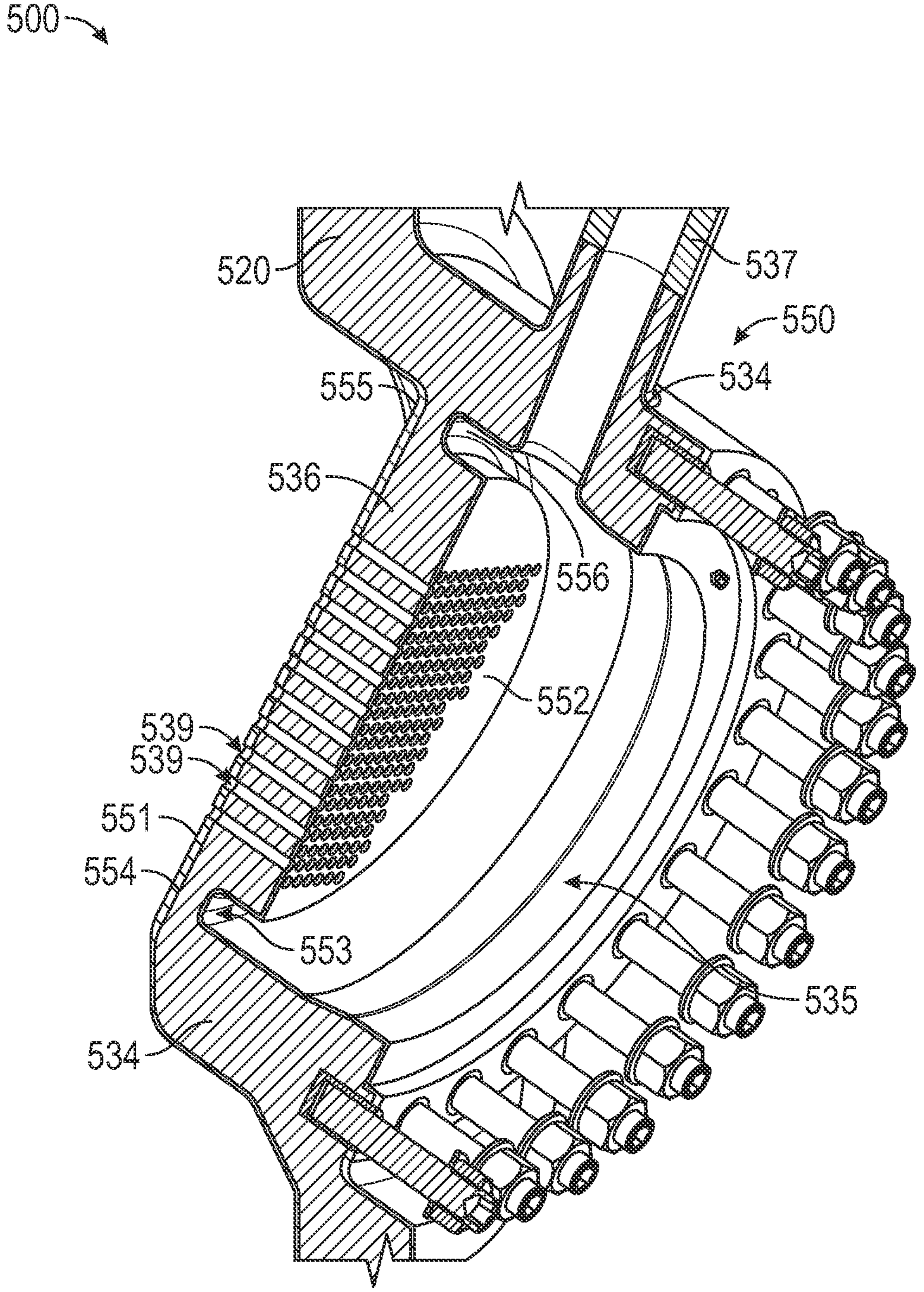

Referring to FIGS. 5A-5D, the tubesheet 536 includes an inner surface 551 (obscured in FIG. 5B) positioned to face the interior of the reactor vessel 520 and an outer surface 552 (obscured in FIG. 5A), opposite the inner surface 551, and positioned to face the plenum 535 and the cover plate 538. The perforations 539 can extend entirely through the tubesheet 536 from the inner surface 551 to the outer surface 552. Referring to FIG. 5B-5D, the tubesheet assembly 550 further includes a groove 553 extending circumferentially about the tubesheet 536 and defining a connection portion 554 (which can also be referred to as a connection region, a flexible portion, a stress-relieving portion, a thinned portion, a weakened portion, and/or the like) between the tubesheet 536 and the adjoining portions of the reactor vessel 520 and/or the body 534. Accordingly, the connection portion 554 can have a thickness $T_1$ (FIG. 5C) that is less than a thickness $T_2$ (FIG. 5C) of the tubesheet 536. In some embodiments, the thickness $T_2$ can be between about 2-6 times larger, about two times larger, about three times larger, and/or about four times larger than the thickness $T_1$. The tubesheet 536 can be integral with the connection portion 554, the body 534, and/or the reactor vessel 520.

In the illustrated embodiment, the groove 553 and the connection portion 554 extend entirely circumferentially about the tubesheet 536 and each have a circular shape with a constant width W (FIG. 5C). That is, the connection portion 554 can be a thinned annular ring around the tubesheet 536. Moreover, the groove 553 extends from the outer surface 552 of the tubesheet 536 toward the inner surface 551 of the tubesheet 536 such that the connection portion 554 is positioned adjacent to the inner surface 551 of the tubesheet 536. More specifically, referring to FIGS. 5C and 5D, the connection portion 554 can include an inner surface 555 positioned to face the interior of the reactor vessel 520 and an outer surface 556, opposite the inner surface 555, positioned within the groove 553 and to face the plenum 535. The inner surface 555 of the connection portion 554 can be coplanar with the inner surface 551 of the tubesheet 536, while the outer surface 556 of the connection portion 554 can be offset from the outer surface 552 of the tubesheet 536. In other embodiments, the groove 553 can extend only partially about the tubesheet 536, can have other shapes (e.g., as shown in and described in detail with reference to FIGS. 7A-7C), and/or can extend alternatively or additionally from the inner surface 551 (e.g., as shown in and described in detail with reference to FIGS. 7A-7C).

Figure 6A:
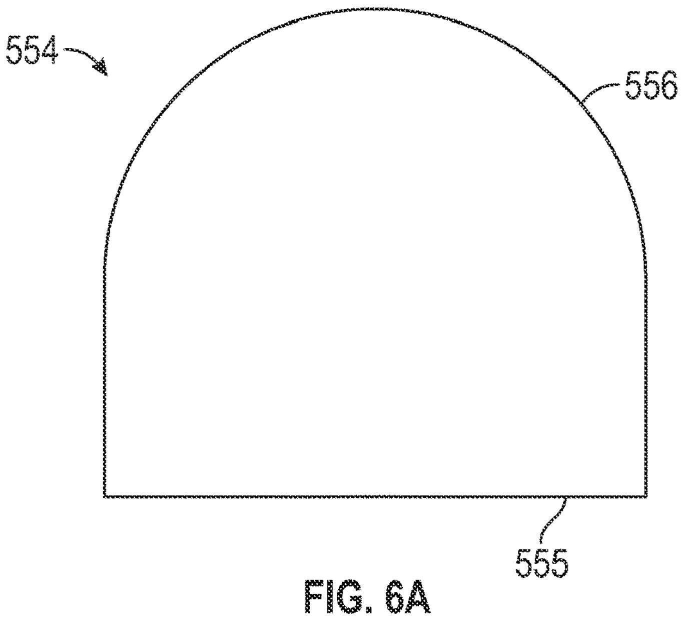
FIGS. 6A-6C are cross-sectional side views of a connection portion of a steam generator system of the nuclear reactor system of FIGS. 5A-5D illustrating different profiles for an outer surface of the connection portion in accordance with embodiments of the present technology.
Figure 6B:
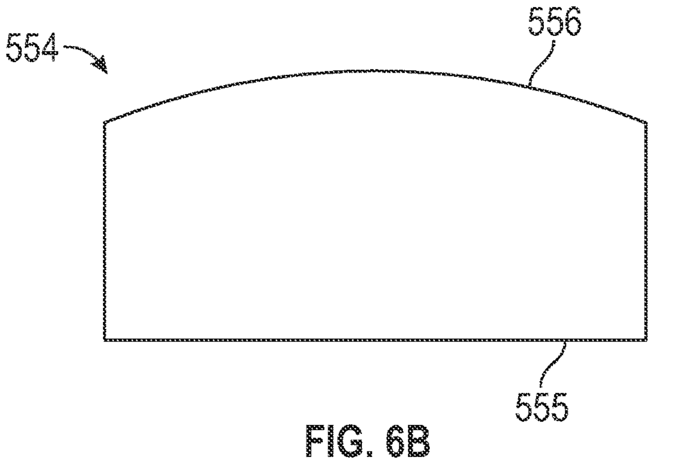
Figure 6C:
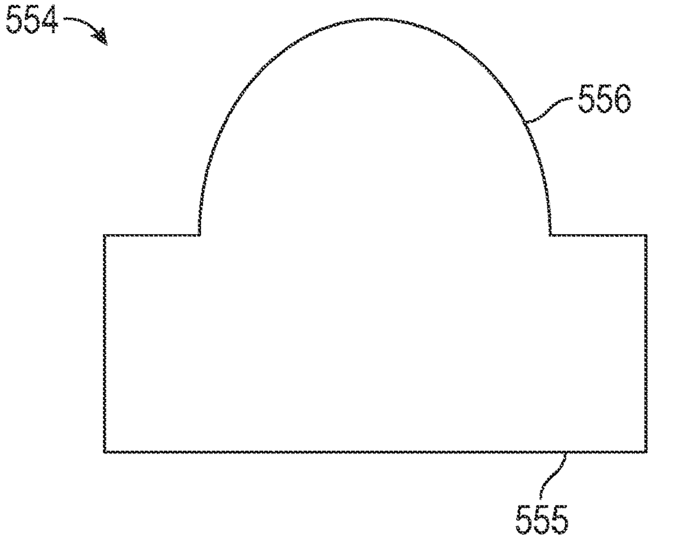

In the illustrated embodiment, the inner and outer surfaces 555, 556 of the connection portion 554 are each planar/flat. In other embodiments, the inner and/or outer surfaces 555, 556 can have different profiles. For example, FIGS. 6A-6C are cross-sectional side views of the connection portion 554 illustrating different profiles for the outer surface 556 in accordance with embodiments of the present technology. As shown in FIGS. 6A-6C, the outer surface 556 can have a curved spherical shape, a curved cylindrical shape, and/or an omega shape, respectively. In other embodiments, the inner surface 555 can have a similar shape and/or the inner surface 555 and/or the outer surface 556 can have other shapes (e.g., polygonal, irregular, etc.).

Referring to FIGS. 5A-5D, the connection portion 554 can be more flexible (e.g., less stiff) than the adjoining components it connects—e.g., the tubesheet 536, the body 534, and the reactor vessel 520—because it is thinner than the adjoining components. In some embodiments, the connection portion 554 can alternatively or additionally be formed from a more flexible material than the reactor vessel 520 and the tubesheet 536. Accordingly, in some aspects of the present technology, the connection portion 554 can mitigate or reduce the stresses (e.g., discontinuity stresses and/or fatigue) in the tubesheet 536 and/or in the associated connections (e.g., tube-to-tubesheet (TTS) welds) between the tubesheet 536 and the corresponding heat transfer tubes by functioning as a flexible connection between the reactor vessel 520 and the tubesheet 536. Such a flexible connection can decouple the incompatible deformation between the differing geometries of the tubesheet 536 (e.g., a perforated flat plate) and the reactor vessel 520 (e.g., a cylindrical vessel) during cyclic loads. In some embodiments, the cyclic fatigue life of the tubesheet 536 and associated TTS welds can be increased by one order of magnitude, two orders of magnitude, or more—increasing the lifespan of the steam generator system 530.

In some embodiments, individual ones of the perforations 539 can receive a corresponding one of the heat transfer tubes therein, and the heat transfer tube can be welded (e.g., via a TTS weld) or otherwise connected to the tubesheet 536 at and/or proximate to the outer surface 552 of the tubesheet 536. Accordingly, the connections between the heat transfer tubes and the tubesheet 536 can be positioned adjacent the groove 553 opposite the connection portion 554, which extends from proximate the inner surface 551 of the tubesheet 536. Because the connection portion 554 does not extend at or proximate to the outer surface 556 of the tubesheet 536, the tubesheet 536 can flex more readily near the outer surface 552. Accordingly, in some aspects of the present technology, spacing the connections between the heat transfer tubes and the tubesheet 536 away from the connection portion 554 in this manner can further decrease the stresses in the connections during operation of the nuclear reactor system 500.

In some embodiments, the connection portion 554 can be manufactured by milling the groove 553 via a tool inserted into the plenum 535 with the cover plate 538 removed. In some aspects of the present technology, forming the groove 553 to be circular and to have a constant width and depth can reduce the complexity of the manufacturing process used to form the groove 553.

Figure 7A:
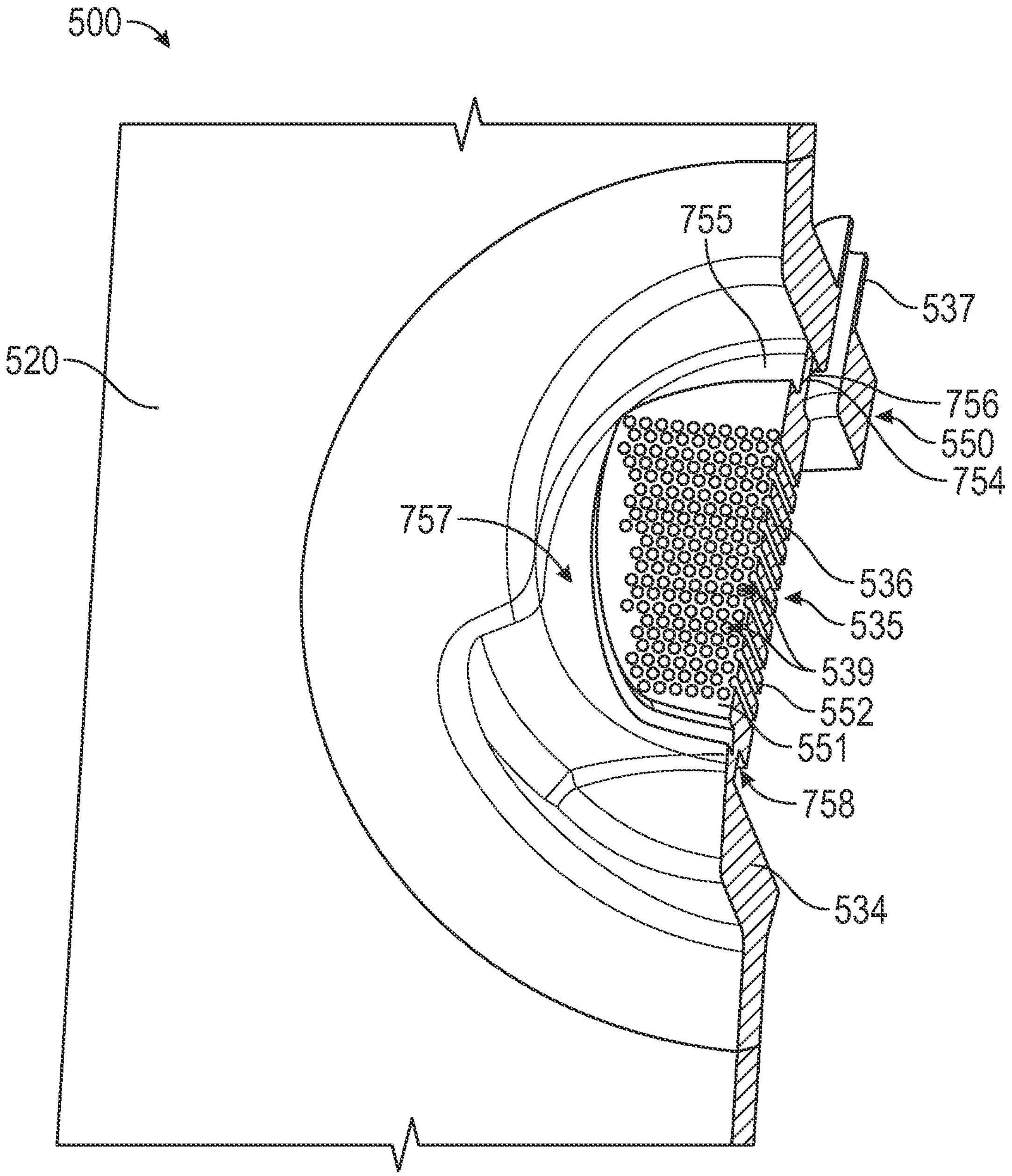
FIGS. 7A-7C are a cross-sectional front view, a cross-sectional rear view, and a cross-sectional side view, respectively, of the nuclear reactor system of FIGS. 5A-5D including a connection portion of the steam generator system configured in accordance with additional embodiments of the present technology.
Figure 7B:
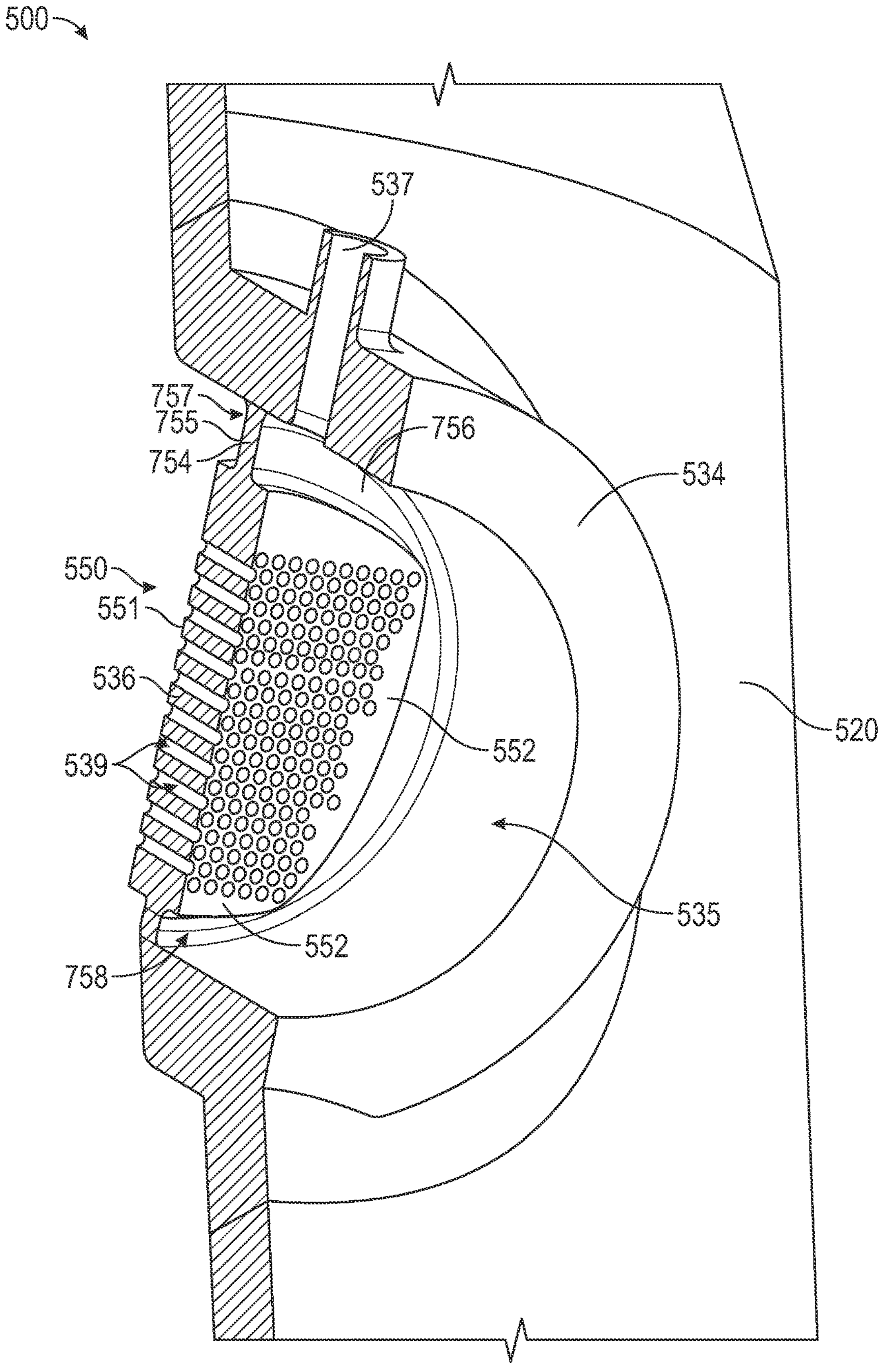
Figure 7C:
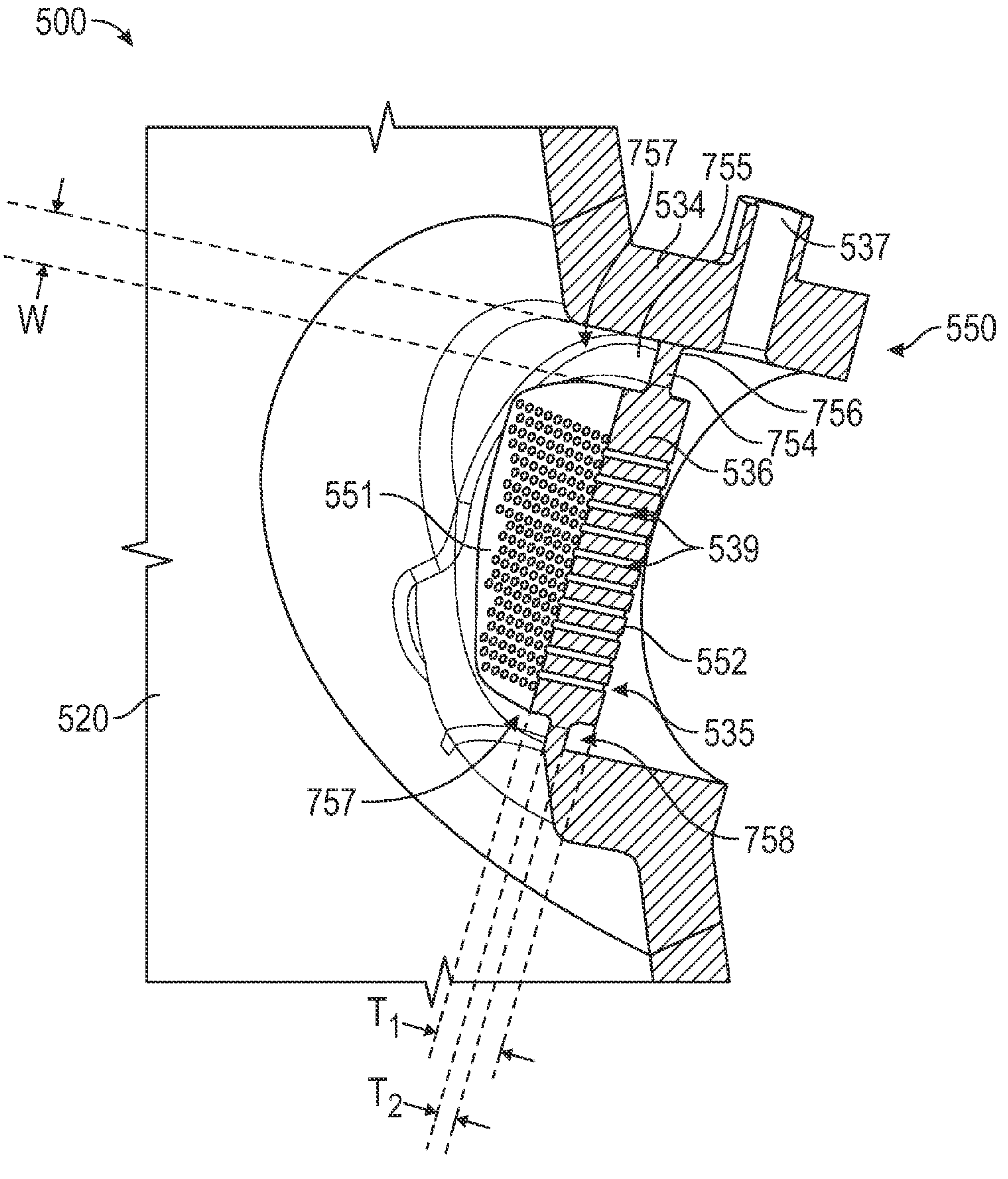

As noted above, tubesheet assemblies in accordance with the present technology can have other configurations of groove(s) extending around a tubesheet that provide a flexible coupling between the tubesheet and an adjoining reactor vessel. FIGS. 7A-7C, for example, are a cross-sectional front view, a cross-sectional rear view, and a cross-sectional side view, respectively, of the nuclear reactor system 500 including a connection portion 754 in accordance with additional embodiments of the present technology. Referring to FIGS. 7A-7C, other than the connection portion 754, the components of the nuclear reactor system 500 can be similar or identical to those shown in and described in detail with reference to FIGS. 5A-5D, and are referenced with the same reference numbers.

In the illustrated embodiment, the tubesheet assembly 550 includes an inner groove 757 and an outer groove 758 extending circumferentially about the tubesheet 536 and defining the connection portion 754 between the tubesheet 536 and the adjoining portions of the reactor vessel 520 and/or the body 534. Accordingly, the connection portion 754 can have a thickness $T_1$ (FIG. 7C) that is less than a thickness $T_2$ (FIG. 7C) of the tubesheet 536. In some embodiments, the thickness $T_2$ can be between about 2-6 times larger, about two times larger, about three times larger, and/or about four times larger than the thickness $T_1$. The tubesheet 536 can be integral with the connection portion 754, the body 534, and/or the reactor vessel 520.

In the illustrated embodiment, the inner and outer grooves 757, 758 and the connection portion 754 extend entirely circumferentially about the tubesheet 536 and each have a lozenge-like or shield-like shape with a variable width W (FIG. 7C) about the tubesheet 536. In some embodiments, the width W can be selected to maintain a minimum clearance between the connection portion 754 and the perforations 539. Moreover, the inner groove 757 extends from the inner surface 551 of the tubesheet 536 toward the outer surface 552 of the tubesheet, and the outer groove 758 extends from the outer surface 552 of the tubesheet 536 toward the inner surface 551 of the tubesheet 536 such that the connection portion 754 is positioned adjacent to a middle portion of the tubesheet 536. More specifically, the connection portion 754 can include (i) an inner surface 755 positioned within the inner groove 757 to face the interior of the reactor vessel 520 and (ii) an outer surface 756, opposite the inner surface 755, positioned within the outer groove 758 and to face the plenum 535. The inner surface 755 of the connection portion 754 can be offset from (e.g., spaced apart from) the outer surface 552 of the tubesheet 536, and the outer surface 756 of the connection portion 754 can similarly be offset from the outer surface 552 of the tubesheet 536.

Accordingly, in some aspects of the present technology the connection portion 754 can be more flexible (e.g., less stiff) than the adjoining components it connects—e.g., the tubesheet 536, the body 534, and the reactor vessel 520—because it is thinner than the adjoining components. Accordingly, in some aspects of the present technology, the connection portion 754 can mitigate or reduce the stresses (e.g., discontinuity stresses and/or fatigue) in the tubesheet 536 and/or in the associated connections (e.g., tube-to-tubesheet (TTS) welds) between the tubesheet 536 and the corresponding heat transfer tubes by functioning as a flexible connection between the reactor vessel 520 and the tubesheet 536.

Although FIGS. 5A-7C illustrate tubesheet assemblies having a tubesheet 536 angled (e.g., inclined) relative to the longitudinal axis L of the reactor vessel 520, the flexible connection portions (e.g., the connection portion 554 and/or the connection portion 754) of the present technology can be used with a tubesheet having any orientation/configuration described herein, and/or in any configuration in which a tubesheet is integrally attached to a reactor vessel. For example, referring to FIG. 2A, a flexible connection portion can be formed between any or all of the horizontally-oriented tubesheets 236 of the lower tubesheet assemblies 231 and the reactor vessel 220 and/or between the horizontally-oriented tubesheets 236 and the body 234 of the tubesheets 236. Similarly, referring to FIGS. 2A and 2B, a flexible connection portion can be formed in the pressurizer plate 217 between any or all of the tubesheets 246 of the upper tubesheet assemblies 233 between the tubesheets 246 and the reactor vessel 220 and/or between the tubesheets 246 and the body 244 of the tubesheets 246. Likewise, referring to FIGS. 3A and 3B, a flexible connection portion can be formed between any or all of the vertically-oriented tubesheets 236 of the lower tubesheet assemblies 231 and the reactor vessel 220 and/or between the vertically-oriented tubesheets 236 and the body 234 of the tubesheets 236.

III. ADDITIONAL EXAMPLES

The following examples are illustrative of several embodiments of the present technology:

1. A steam generator system for use in a nuclear reactor system including a reactor vessel positioned to house a primary coolant, the steam generator system comprising:

a tubesheet assembly coupled to the reactor vessel, forming at least a portion of a plenum, and comprising— a tubesheet including a plurality of perforations fluidly coupled to the plenum; and a connection portion at least partially between the tubesheet and the reactor vessel, wherein the connection portion is more flexible than the tubesheet and the reactor vessel; and a plurality of heat transfer tubes configured to receive a flow of a secondary coolant, wherein individual ones of the heat transfer tubes are fluidly coupled to corresponding ones of the perforations.

2. The steam generator system of example 1 wherein the tubesheet is a flat plate, and wherein the tubesheet assembly includes a groove extending circumferentially about the tubesheet and defining the connection portion.

3. The steam generator system of example 2 wherein the tubesheet includes an inner surface positioned to face an interior of the reactor vessel and an outer surface positioned to face the plenum, and wherein the groove extends partially from the outer surface toward the inner surface.

4. The steam generator system of example 2 or example 3 wherein the flat plate has a circular shape, and wherein the groove has a circular shape with a generally constant width and depth.

5. The steam generator system of example 2 or example 3 wherein the groove has a width that varies in a circumferential direction.

6. The steam generator system of any one of examples 1-5 wherein the tubesheet assembly is integrally formed with the reactor vessel.

7. The steam generator system of any one of examples 1-6 wherein the reactor vessel extends along a longitudinal axis, and wherein the tubesheet is positioned generally parallel to the longitudinal axis.

8. The steam generator system of any one of examples 1-6 wherein the reactor vessel extends along a longitudinal axis, and wherein the tubesheet is inclined relative to the longitudinal axis by an angle of between about 15°-45°.

9. The steam generator of any one of examples 1-6 wherein the reactor vessel extends along a longitudinal axis, and wherein the tubesheet is positioned generally perpendicular to the longitudinal axis.

10. The steam generator system of any one of examples 1-9 wherein the tubesheet is a flat plate having an inner surface positioned to face an interior of the reactor vessel and an outer surface positioned to face the plenum, wherein the tubesheet assembly includes a first groove extending circumferentially about the tubesheet from the inner surface partially toward the outer surface and a second groove extending circumferentially about the tubesheet from the outer surface partially toward the inner surface, and wherein the first groove and the second groove define the connection portion.

11. The steam generator system of any one of examples 1-10 wherein the tubesheet has a first thickness, and wherein the connection portion has a second thickness less than the first thickness.

12. The steam generator system of example 11 wherein the first thickness is less than half the second thickness.

13. The steam generator system of any one of examples 1-12 wherein the tubesheet assembly further comprises an inlet port fluidly coupled to the plenum, and wherein the tubesheet assembly is positioned to receive the secondary coolant in liquid form via the inlet port and route the secondary coolant in liquid form through the plenum into the perforations and into the heat transfer tubes.

14. The steam generator system of any one of examples 1-12 wherein the tubesheet assembly further comprises an outlet port fluidly coupled to the plenum, and wherein the tubesheet assembly is positioned to receive the secondary coolant in vapor form from the heat transfer tubes and route the secondary coolant in vapor form through the perforations into the plenum and into the outlet port.

15. A tubesheet assembly for use in a nuclear reactor system including a reactor vessel, the tubesheet assembly comprising:

a body bounding at least a portion of a plenum;

a tubesheet including a plurality of perforations fluidly coupled to the plenum, wherein the tubesheet assembly is coupled to the body and the reactor vessel; and a connection portion at least partially between the tubesheet and the reactor vessel, wherein the connection portion is more flexible than the tubesheet and the reactor vessel.

16. The tubesheet assembly of example 15 wherein the tubesheet is a circular flat plate having an inner surface positioned to face an interior of the reactor vessel and an outer surface positioned to face the plenum, wherein the tubesheet assembly includes a circular groove extending circumferentially about the tubesheet and defining the connection portion, and wherein the circular groove extends from the outer surface partially toward the inner surface.

17. The tubesheet assembly of example 15 or example 16 wherein the tubesheet is a circular flat plate having an inner surface positioned to face an interior of the reactor vessel and an outer surface positioned to face the plenum, wherein the tubesheet has a first thickness in a direction between the inner surface and the outer surface, and wherein the connection portion has a second thickness, less than the first thickness, in the direction between the inner surface and the outer surface.

18. The tubesheet assembly of any one of examples 15-17 wherein the reactor vessel extends along a longitudinal axis, and wherein the tubesheet is inclined relative to the longitudinal axis by an angle of about 30°.

19. A nuclear reactor system, comprising:
a reactor vessel positioned to house a reactor core and a primary coolant, wherein the primary coolant is positioned to absorb heat from a nuclear reaction within the reactor core; and
a steam generator assembly, comprising:
a first tubesheet assembly including a first tubesheet, wherein the first tubesheet is coupled to the reactor vessel and includes a plurality of first perforations, wherein the first tubesheet assembly includes a flexible connection portion positioned between the first tubesheet and the reactor vessel, wherein the flexible connection portion comprises an annular ring around the first tubesheet having a thickness less than a thickness of the first tubesheet;
a second tubesheet assembly including a second tubesheet, wherein the second tubesheet is coupled to the reactor vessel and includes a plurality of second perforations; and
a plurality of heat transfer tubes configured to receive a secondary coolant, wherein the secondary coolant is configured to absorb heat from the primary coolant through the heat transfer tubes, and wherein individual ones of the heat transfer tubes have a first portion fluidly coupled to a corresponding one of the first perforations of the first tubesheet and a second portion fluidly coupled to a corresponding one of the second perforations of the second tubesheet.

20. The nuclear reactor system of example 19 wherein the first tubesheet assembly is positioned to receive the secondary coolant in liquid form and route the secondary coolant in liquid form to the heat transfer tubes via the first perforations, wherein the reactor vessel extends along a longitudinal axis, and wherein the first tubesheet is inclined relative to the longitudinal axis by an angle of between about 15°-45°.

IV. Conclusion

All numeric values are herein assumed to be modified by the term about whether or not explicitly indicated. The term about, in the context of numeric values, generally refers to a range of numbers that one of skill in the art would consider equivalent to the recited value (e.g., having the same function and/or result). For example, the term about can refer to the stated value plus or minus ten percent. For example, the use of the term about 100 can refer to a range of from 90 to 110, inclusive. In instances in which the context requires otherwise and/or relative terminology is used in reference to something that does not include, or is not related to, a numerical value, the terms are given their ordinary meaning to one skilled in the art.

The above detailed description of embodiments of the present technology are not intended to be exhaustive or to limit the technology to the precise forms disclosed above. Although specific embodiments of, and examples for, the technology are described above for illustrative purposes, various equivalent modifications are possible within the scope of the technology, as those skilled in the relevant art will recognize. For example, although steps may be presented in a given order, in other embodiments, the steps may be performed in a different order. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

As used herein, the phrase and/or as in A and/or B refers to A alone, B alone, and A and B. Additionally, the term comprising is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A steam generator system for use in a nuclear reactor system including a reactor vessel positioned to house a primary coolant, the steam generator system comprising:
a tubesheet assembly coupled to the reactor vessel, forming at least a portion of a plenum, and comprising—
a tubesheet including a plurality of perforations fluidly coupled to the plenum, wherein the reactor vessel extends along a longitudinal axis, and wherein the tubesheet is inclined relative to the longitudinal axis by an angle of between about 15°-45°; and
a connection portion at least partially between the tubesheet and the reactor vessel, wherein the connection portion is more flexible than the tubesheet and the reactor vessel; and
a plurality of heat transfer tubes configured to receive a flow of a secondary coolant, wherein individual ones of the heat transfer tubes are fluidly coupled to corresponding ones of the perforations.

2. The steam generator system of claim 1 wherein the tubesheet is a flat plate, and wherein the tubesheet assembly includes a groove extending circumferentially about the tubesheet and defining the connection portion.

3. The steam generator system of claim 2 wherein the tubesheet includes an inner surface positioned to face an interior of the reactor vessel and an outer surface positioned to face the plenum, and wherein the groove extends partially from the outer surface toward the inner surface.

4. The steam generator system of claim 2 wherein the flat plate has a circular shape, and wherein the groove has a circular shape with a generally constant width and depth.

5. The steam generator system of claim 2 wherein the groove has a width that varies in a circumferential direction.

6. The steam generator system of claim 1 wherein the tubesheet assembly is integrally formed with the reactor vessel.

7. The steam generator system of claim 1 wherein the tubesheet is a flat plate having an inner surface positioned to face an interior of the reactor vessel and an outer surface positioned to face the plenum, wherein the tubesheet assembly includes a first groove extending circumferentially about the tubesheet from the inner surface partially toward the outer surface and a second groove extending circumferentially about the tubesheet from the outer surface partially toward the inner surface, and wherein the first groove and the second groove define the connection portion.

8. The steam generator system of claim 1 wherein the tubesheet has a first thickness, and wherein the connection portion has a second thickness less than the first thickness.

9. The steam generator system of claim 8 wherein the first thickness is less than half the second thickness.

10. The steam generator system of claim 1 wherein the tubesheet assembly further comprises an inlet port fluidly coupled to the plenum, and wherein the tubesheet assembly is positioned to receive the secondary coolant in liquid form via the inlet port and route the secondary coolant in liquid form through the plenum into the perforations and into the heat transfer tubes.

11. The steam generator system of claim 1 wherein the tubesheet assembly further comprises an outlet port fluidly coupled to the plenum, and wherein the tubesheet assembly is positioned to receive the secondary coolant in vapor form from the heat transfer tubes and route the secondary coolant in vapor form through the perforations into the plenum and into the outlet port.

12. The steam generator system of claim 1 wherein the primary coolant is positioned to absorb heat from a nuclear reaction within the reactor core.

13. The steam generator system of claim 1 wherein the secondary coolant is configured to absorb heat from the primary coolant through the plurality of heat transfer tubes.

* * * * *